United States Patent [19]

Cortez

[11] 3,789,361

[45] Jan. 29, 1974

[54] RECOGNITION SYSTEM AND PROCESSOR

[75] Inventor: Edward Cortez, Rockville, Md.

[73] Assignee: Fairchild Industries, Inc., Germantown, Md.

[22] Filed: Apr. 17, 1972

[21] Appl. No.: 244,504

[52] U.S. Cl. .............. 340/146.3 AQ, 340/146.3 MA

[51] Int. Cl. .............................................. G06k 9/12

[58] Field of Search 340/146.3, 146.3 AQ, 146.3 R, 340/146.3 MA

[56] References Cited

UNITED STATES PATENTS

| | | | |
|---|---|---|---|
| 3,104,372 | 9/1963 | Rabinow et al. | 340/146.3 AG |
| 3,618,016 | 11/1971 | Van Steenis | 340/146.3 Y |

*Primary Examiner*—Paul J. Henon
*Assistant Examiner*—Leo H. Boudreau
*Attorney, Agent, or Firm*—Michael W. York

[57] ABSTRACT

A recognition system for viewing and processing information on an article such as a letter or the like including an optical system for viewing the information, a diode array for converting the viewed image of the information into analog electrical signals, an amplifier for amplifying the analog electrical signals, an input conditioner for converting the amplified analog electrical signals into digital signals and a processor for processing the digital signals to compensate for errors which might be present in the information on the article and in the analog and digital signals.

9 Claims, 16 Drawing Figures

PATENTED JAN 29 1974 3,789,361

SHEET 02 OF 15

PATENTED JAN 29 1974 3,789,361

SHEET 06 OF 15

RECOGNITION SYSTEM AND PROCESSOR

BACKGROUND OF THE INVENTION

In automatic processing systems, the objective is, in general, to process materials which may range from small pieces of paper, such as letters, to larger items, such as railroad boxcars, or to process information such as the quantity of elecricity used by someone, or the number of railroad boxcars to be sent to a particular destination. These materials or information must be processed through some system so that they can be sent to their proper destination as rapidly, accurately, and economically as possible. The initial instructions for processing the materials or information are usually contained in some humanly prepared form or in a humanly readable document. The processing instructions or information must then be transformed to a media or format that is compatible with the automatic machines. This transformation process forms a bottleneck in the entire process since the information transformation process usually requires that a person read a document and then enter the information into a machine, usually by some key-board terminal. To help solve this problem, readers were developed to automatically read and transform the information to handling instructions required by the automatic materials or information processing systems. Punched card readers, paper tape readers, and in particular, optical readers, have been developed to transform the information more rapidly from one media to another.

In general, optical readers can be grouped into multifont readers or fixed font readers. A multi-font optical reader would be required to read, for example, typewritten information and handwritten information, or stylized numbers. A fixed font optical reader would be required to read only a limited style of printing such as the bar/half bar code that is currently being used by the U. S. Postal Service.

The bar-half bar code system is a method of imprinting all the information on envelopes that is required to automatically sort the envelopes within the U. S. Postal Service. The entire code on an envelope consists of a mixed series of two types of bars, a full length bar and a half length bar, with the total number of bars on any envelope varying between 56 and 105 bars, depending on the amount of information required for that envelope. The full length bar is 0.110 ± 0.010 inches in length, while the half bar is 0.050 ± 0.010 inches in length. The bars are presently placed 30 to 34 bars per inch on the envelope, with each bar width being equal to between 20 and 80 percent of the bar pitch. For 30 to 34 bars to the inch, the bar pitch is one-thirtieth to one-thirty-fourth of an inch.

The information contained within a bar code is used in two stages. Consequently, the bars within the bar code are clustered into two groups, and each group is called a field. The fields are separated by a distance equivalent to 5 bar pitches. The first field as seen from the left to the right on the envelopes, is called the outgoing field since it contains the destination zip code. The destination zip code is obviously the first level of information usable in any letter sorting system. The second field, as viewed from left to right on the envelope, is the incoming field, and it contains information that varies from the usual block and house number plus the street name, to information such as postal rate, destination zip zone and box number. The automatic sortation of letters is accomplished by using a letter transport to move individual letters past an optical reader in order to permit automatic extraction of bar code information and subsequent segregation of the letters into different containers as dictated by the information extracted. These letter transports are presently capable of moving the letters past an optical bar code reader at speeds between 100 and 250 inches per second.

The bar code is presently imprinted on the envelope in an area that is horizontally bounded by the right hand edge of the envelope and a point 3.50 to 3.75 inches to the left of that right edge, and is vertically limited to the area between 0.150 and 0.485 inches from the bottom edge of the envelope with everything being measured on the stamped and addressed side of the letter. The full length bar is used to represent a binary 1 bit while the half length bar represents a 0 binary bit so that a binary coding scheme can be used. Both types of bars have their long dimensions nominally perpendicular to the bottom edge of the envelope. However, due to imprinting and letter handling tolerances, the optical reader may see the bars rotated from their nominal vertical direction by as much as ± 7.9°.

The volume of mail that is sent yearly through the U. S. Postal Service requires a reader that can quickly read huge quantities of envelopes that suffer degradations in their codes, as seen by the reader, due to variations in envelope folding, printer characteristics, envelope colors, and letter transport system handling characteristics. The many degradations in the code can lead to errors in processing the information. These errors, when viewed in terms of the total number of envelopes mailed per year in the United States, lead to high quantities of mishandled mail pieces. Reading accuracy then becomes an important problem which has not been successfully resolved in the past. Techniques used in optical character readers are applicable to the reading of the bar/half bar code, but their techniques have drawbacks as indicated in the following. In general, optical character reader systems use varying amounts of analysis of the analog input signal. The amount of similarity of one character to another at present determines the minimum amount of input analysis that must be accomplished. The analysis is performed over the entire area that contains the characters and consequently, increases in the character details which must be resolved rapidly increase the amount of equipment required to perform the real time, or on-line analysis of the input data stream. An optical character reading system analyzes the input data stream to obtain an indication of the sign of the coefficient for harmonic frequencies that are contained within the input data sample. The analysis would be obtained by using a harmonic frequency generator to generate a series of square wave signals whose fundamental frequencies are harmonically related, and an integrator for each harmonic frequency analyzed to integrate the product of the input signal and the various square wave signals. The results of each integration would form descriptors such that if the result of each integration was a positive number, the descriptor for that frequency analysis would be a binary 1 and a binary 0 descriptor would result from that frequency analysis if the result of the integration were negative. The period of each integration would be identical to the period of time required to read the area containing a character. The input data is now encoded into descriptors, each of which can now be compared to a stored set of descriptors so that a cross correlation is established between the stored descriptors and the descriptors generated by the input data stream. The stored character whose descriptors have the highest cross correlation with the input data stream descriptors, or closest match, is selected as the character read. The on-line computation of the various descriptors into which the input data can be encoded, the on-line computation of the cross correlation of the input data descriptors with all the equivalent stored descriptors, and the on-line selection of the stored character with the highest descriptor cross correlation imposes economic constraints on the number of harmonics that can be investigated.

A simplification of the overall processing scheme has been implemented using a different approach to encode the input data stream. The same character area is scanned to generate an analog input data stream. The scanning is done in "narrow" parallel lines on the scene to be read, and the resultant analog signal is analyzed to determine when an off-character to on-character transition is made, or vice versa. Each scanning line is long enough to encompass the entire character in any of its dimension. A group of scanning lines are used to cover the entire character in the dimension perpendicular to the scanning lines. The total number of character transitions is the result of the analysis of the character for that line. To provide additional data for analyzing the character, another group of scanning lines is generated so that the character is scanned again except that there is an angular rotation of the direction of the scanning lines. The line to line spacing may or may not be maintained; however, the scanning lines still encompass all of the character being read. The angular rotation is incremental between groups of scanning lines by some constant angle, say 20°, so that, from the horizontal, the character is read at 20, 40, 60, 80, 100, 120, 140 and 160° intervals. The sequential number of transitions per scan line is stored in some memory as a series of binary numbers so that, after the character is analyzed, a time history of the number of transitions per line for that character is available in the memory when all the angular rotations for the groups of scan lines have been completed. All the bits that comprise the sequential transitions that are stored in the memory are fed via resistor matrices to summing amplifiers, one resistor matrix and one summing amplifier per different character to be read. The individual resistor value in each resistor matrix is selected to represent the logarithm of the probability of that binary bit being the correct 1 or 0 value for the character associated with that resistor matrix. The summing amplifier with the highest probability of being correct is identified since the most correct summing amplifier will have the highest output. The probabilities computed are conditional probabilities since they represent the probability that, given a particular sequence of inputs, those inputs were caused by one particular character, then by another, until all characters have had their conditional probability computed. A relative comparison of the amplitude of the summing amplifier outputs can be employed to determine which summing amplifier has the highest probability of being correct. The character associated with that summing amplifier is selected as the amplifier with the character read.

Another way of looking at the decision making operation is to consider that the cross correlation of the time history of the input data with all the stored time histories was performed and the character with the highest cross correlation was selected. The criterion for encoding the input data into a binary form as well as the weight assigned to each input data bit was different for both cases. Hence, although this data processing scheme is an improvement over the first scheme described, both still share similar drawbacks since on-line encoding of the input data stream must be done into multiple binary bits and on-line calculation of all conditional probabilities must be accomplished using the fixed program incorporated into all the resistor matrices. Economic considerations quickly determine that only an absolute minimum of conditional probabilities must be computed, since, within a narrow range, the cost of the system built will increase by a constant amount as each new conditional probability calculation is added. A better approach would be to make the system cost increase negligible per increase in processing capability. The increase in processing capability can be used to improve the error rate of the optical reader, resulting in a more cost effective optical reader. A condition that demonstrates another drawback of this data processing scheme is the area impacted if the number of characters or the font of the characters were changed.

A change in the number of characters or the font of the characters can lead to a change in the number of scan lines per group, the incremental angular rotation between groups, and the fixed resistor martices that contain the conditional probability programs. A simpler technique involves the encoding of the input analog information into one of several binary levels. Each encoded binary number can represent an average of the input, taken over a small time interval of the input analog signal. The sequential binary numbers representing the encoded input sample are fed into another encoding matrix which assigns a binary weight to the encoded input sample. The double encoded information out of the binary weight assigning matrix is fed into a series of accumulators, one for each of the possible characters to be read. In the accumulators, the sequential weights caused by the sequential input sampler are summed so that, if a pre-set minimum weight threshold is exceeded, the character associated with that accumulator is chosen as the correct character. The weight assigned to each encoded input sample will be a function of the binary level of the input, the time sequence position of the input sample, and the particular output character for which the weight code is being assigned. Thus, for a particular input sample, as many weights will be assigned to it as there are characters to be read and a different sequence of weights will be assigned to the same sample if it occurs in a different time slots. The drawbacks of this processing scheme are in the requirement for multiple codes so that the time varying coding requirement can be met, the requirement for multiple encoders so that the same input sample can be assigned a separate weight for each possible character, the requirement for an accumulator for each character, and, in particular, the requirement for encoding each input sample into several binary bits to represent the input signal level. A case that this scheme cannot handle easily, without major growth in components and codes, is the case where the background of the character varies. The variation of the background could be caused by changes in the transmissivity or reflectivity of the character background. Reflectivity changes could be introduced by, for example, changing the texture of or the color of the paper the character is printed on. Additional coding schemes would have to be implemented, and the same character may generate different total weights as a result of background changes. A major advantage of this processing scheme is in the reduction of on-line calculation compared to other equipment.

The present invention overcomes the various drawbacks associated with the described processing schemes by eliminating the need for on-line calculation of extensive input data characteristics and by making more efficient use of encoded a-priori probability calculations and decision making. Extensive input data analysis is eliminated in favor of a binary answer of a 1 or 0 corresponding to a character is, or is not present in an input sample. Hence, counting character transitions by a scanning input line is not required, a harmonic analysis of the input data stream is not required, nor is the input data encoded into multiple levels. By improving the coding scheme and by making provisions for multiple levels of input data encoding, more efficient use is made of the memory storage capacity of the system. The benefits are that more results of pre-calculated probabilities, more levels of data encodings are possible, and more accumulations of pre-determined, intermediate data processing are possible with the direct result that on-line data calculations are reduced to a minimum. The usual character locating operation must still be performed but all other data processing involves what may be characterized as table look-up operations. A final table look-up operation can also be used to do the final character selection. A direct result of the processing scheme that is used in this invention is that the changing the input character format only requires changes in the encoding codes stored in various memories within the system. By using read only memories to store the encoding codes, the area impacted by the change of the input character format is minimized and is limited to the read only memories and possibly the data accumulators. The present invention also overcomes the disadvantages associated with previous optical reader systems by making allowances for errors in each data handling step and by making use of the redundancy that is inherent in the input information. A versatile, accurate and economic optical reader or recognition processor is the result of one implementation of this invention.

SUMMARY OF THE INVENTION

This invention relates to pattern recognition processors and systems and more particularly to pattern recognition processors and systems which attempt to eliminate incorrect or extraneous information.

It is accordingly an object of the invention to provide a recognition system and processor which accurately processes information.

It is also an object of the invention to provide a recognition system and processor which is capable of interpreting imperfect input data.

It is a further object of the present invention to provide a recognition system and processor which can be utilized to handle a wide range of input data.

It is a further object of the invention to provide a recognition system and processor which requires only a limited memory.

It is a further object of the invention to provide a recognition system and processor which is capable of handling data with a minimum of pre-processing.

The present invention provides an apparatus for viewing and processing information on an article which includes means for viewing the information, means for converting the viewed image of the information into analog electrical signals, means for amplifying the analog electrical signals and means for converting the analog electrical signals into digital electrical signals. Means are also provided for processing the digital signals to compensate for errors which might be present in the information viewed on the article and in the analog and digital signals.

BRIEF DESCRIPTION OF THE DRAWINGS

The invention will be hereinafter more fully described with reference to the accompanying drawings in which.

DETAILED DESCRIPTION OF THE PREFERRED EMBODIMENT

Figure 1:
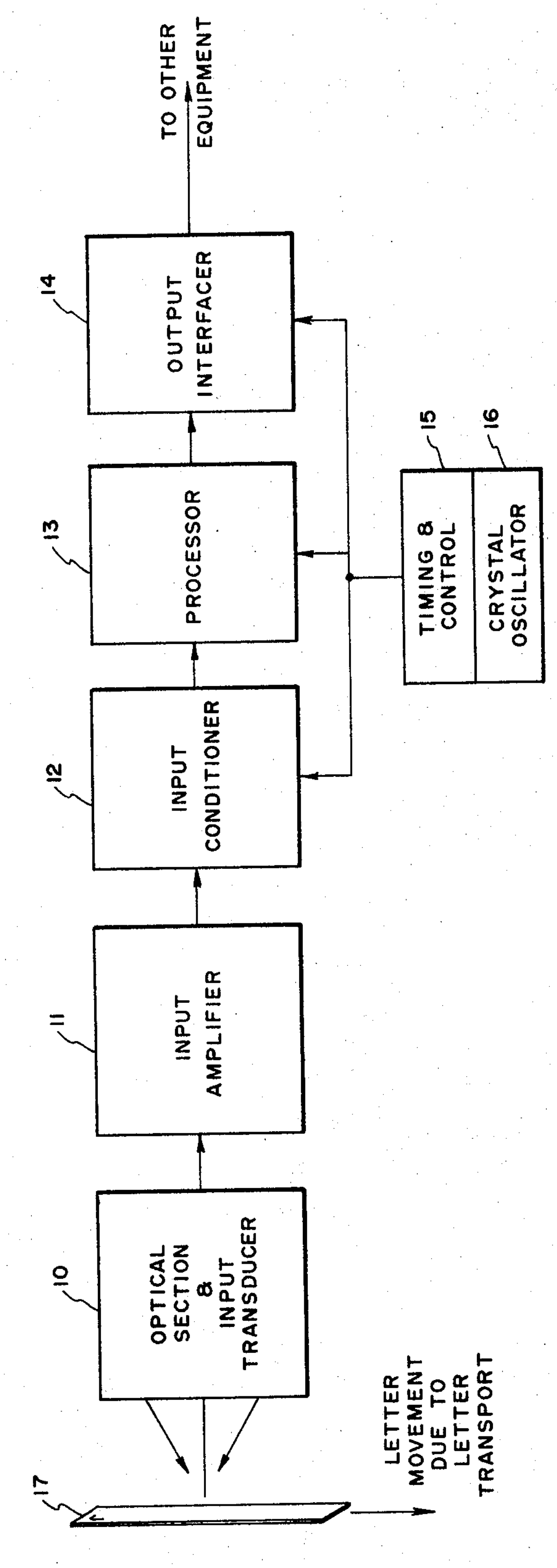
FIG. 1 is a block diagram of a pattern recognition system embodying the present invention.

Referring first to FIG. 1, the recognition system of this invention is illustrated and it comprises an optical system and an input transducer 10 for viewing the data which is to be read, an input amplifier 11 connected to the optical system and input transducer, an input conditioner 12 connected to the input amplifier, a processor 13 connected to the input conditioner, an output interfacer 14 connected to the processor, and a timing and control section 15 which is controlled by a crystal oscillator 16 and is connected to the input conditioner, the prcessor and the output interfacer. The usual power supplies are standard items and hence they are not illustrated.

Figure 2:
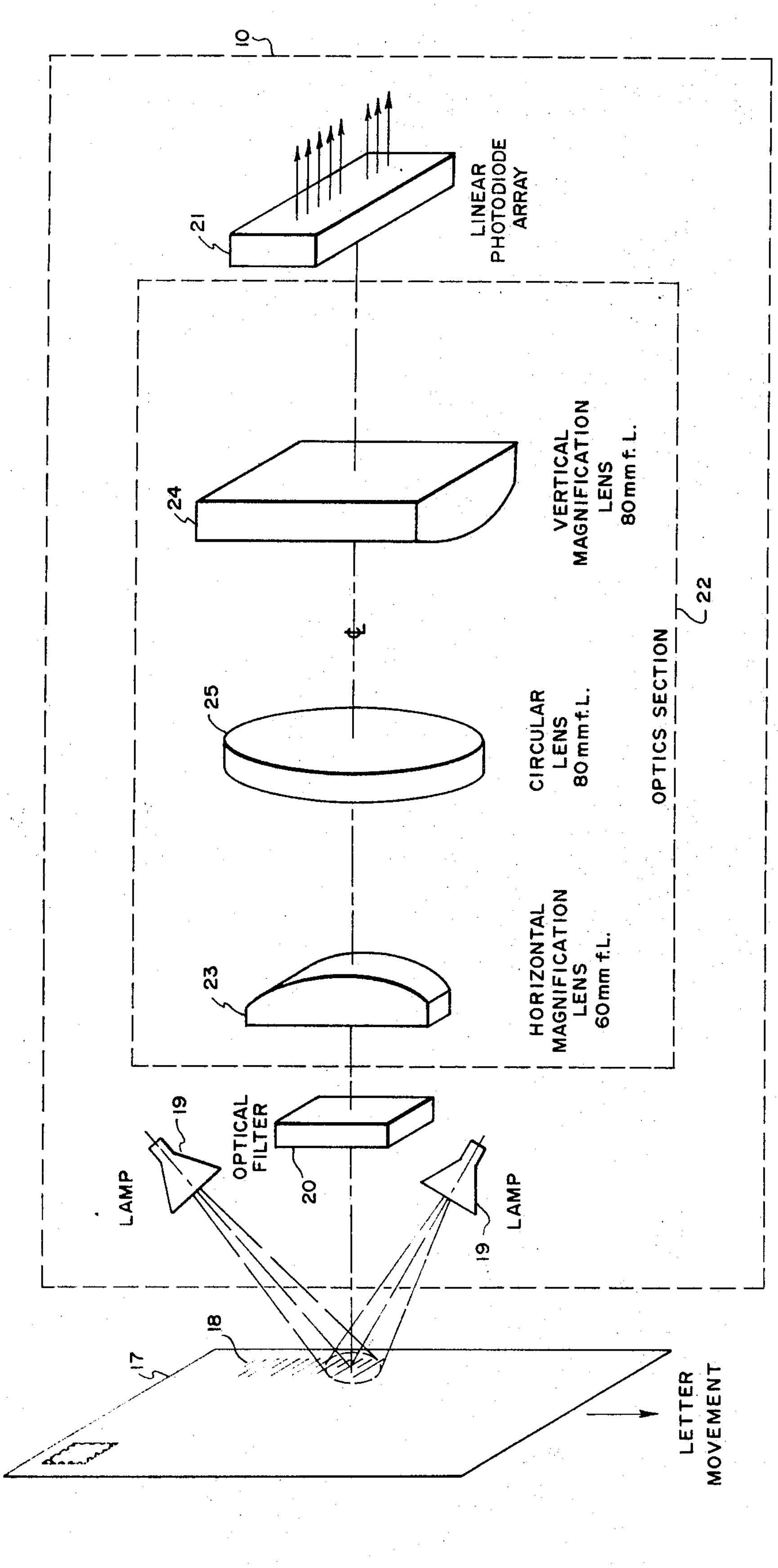
FIG. 2 is a detailed schematic view of a portion of the system illustrated in FIG. 1.

In FIG. 2, the optical system and input transducer 10 is illustrated viewing a document 17 such as a letter or envelope which is moving and is imprinted with data which comprises the bar/half bar code 18 currently used by the U. S. Postal Service. The optical system and input transducer 10 comprises an optical filter 20 that may or may not be required depending on the inks used in imprinting the bar/half bar code 18 on the target document 17, lamps 19, a linear photodiode array 21 and an optics system 22 that focuses the area illuminated on the document 17 on the linear photodiode array 21. The lamps 19 may be General Electric 150 Watt projector lamps, type EJN, and they should be aimed so that their main concentration of light is at the point on the envelope intersected by the optical center line of the optics system 22. The optical filter 20 is usable as a light spectrum sensitivity shaping device that can allow the diode array 21 to respond only to energy in the visible region, the near infrared region, or any spectrum in between. A dichroic filter which limits the optical system response to between 400 nanometers and 600 nanometers has been used successfully.

The optics system 22 comprises a 60 mm focal length cylindrical lens 23 located in position to be closest to the document 17, another 80 mm focal length cylindrical lens 24 located in position to be furthermost from the document 17, and an 80 mm focal length circular lens 25 located between the lenses 23 and 24. The cylindrical lens 24 is set so that its long axis is at a right angle to the long axis of the first cylindrical lens 23, so that independent magnifications could be obtained in the horizontal and vertical direction. The optical system thus formed permits a standard diode array to be used for a specialized application since the spatial resolution of the system, on the surface of the target envelope, is determined by the horizontal and vertical magnification properties of the anamorphic optical system and the horizontal and vertical dimensions of each element within the diode array 21 instead of only the physical dimensions of the diode array elements. The vertical resolution successfully used was such that at most 8 contiguous signal channels would be required to encompass the bar code data. The circular lens which has been used successfully is a microscope objective type M226 which is obtainable from Gaertner Scientific Company of Chicago, Illinois while the cylindrical lenses which have been used successfully are type LCP–005 for the horizontal magnification and LCP–009 for the vertical magnification which are obtainable from Optical Industries of Santa Anna, California.

Figure 3:
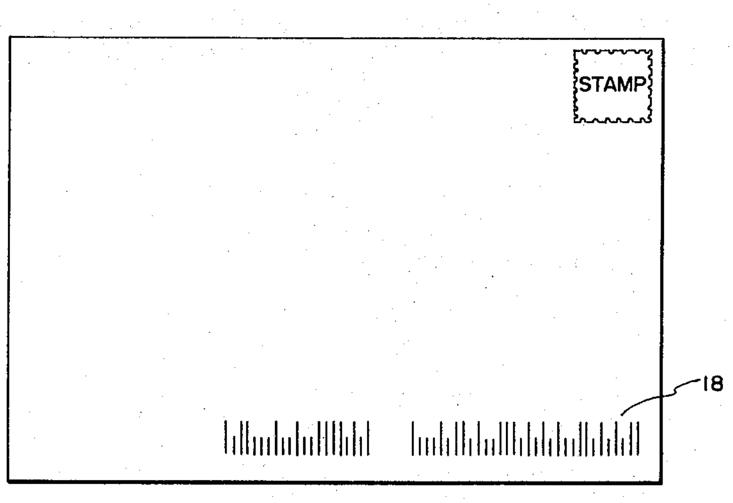
FIGS. 3 and 4 are representations of a bar/half bar code located on an envelope and as it is viewed by the optical reader.
Figure 4:
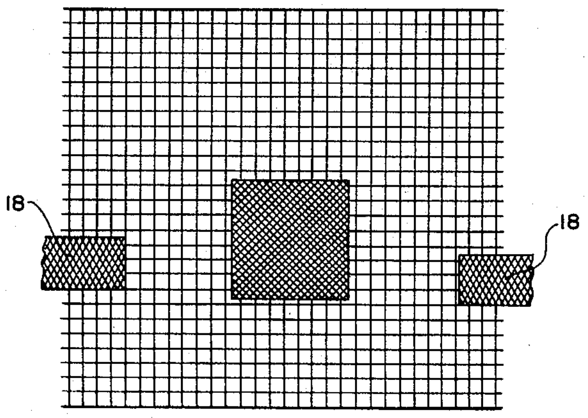

FIGS. 3 and 4 illustrate the bar/half bar code viewed by the optics system 22. In FIG. 4, a portion of the bar/half bar code has been expanded by the optics system 22 to the required scale to observe the individual bars. The combination of the minimum bar width equal to 20 percent of the bar pitch, plus the 34 bars per inch, and a well known theorem from communications theory called the Sampling Theorem, indicate that a minimum data sampling interval of 0.005 inches measured on the surface of the envelope is required. The effects of the possible ± 7.9° rotation requires a further reduction in the data sampling interval to require sampling the data on the envelope every 0.002 of an inch. Each square in FIG. 4 represents the surface of the envelope which is focused on photodiode elements comprising an individual resolution element. Each square will represent an individual input data sample so that a column of squares will represent all twenty-seven input data samples available to the system at any one time. Going from one column of squares to the adjacent one, from left to right, represents going from one group of input data samples to the next group of input data samples in time sequence. The horizontal width of each square represents 0.002 inches on the surface of the envelope.

Figure 5:
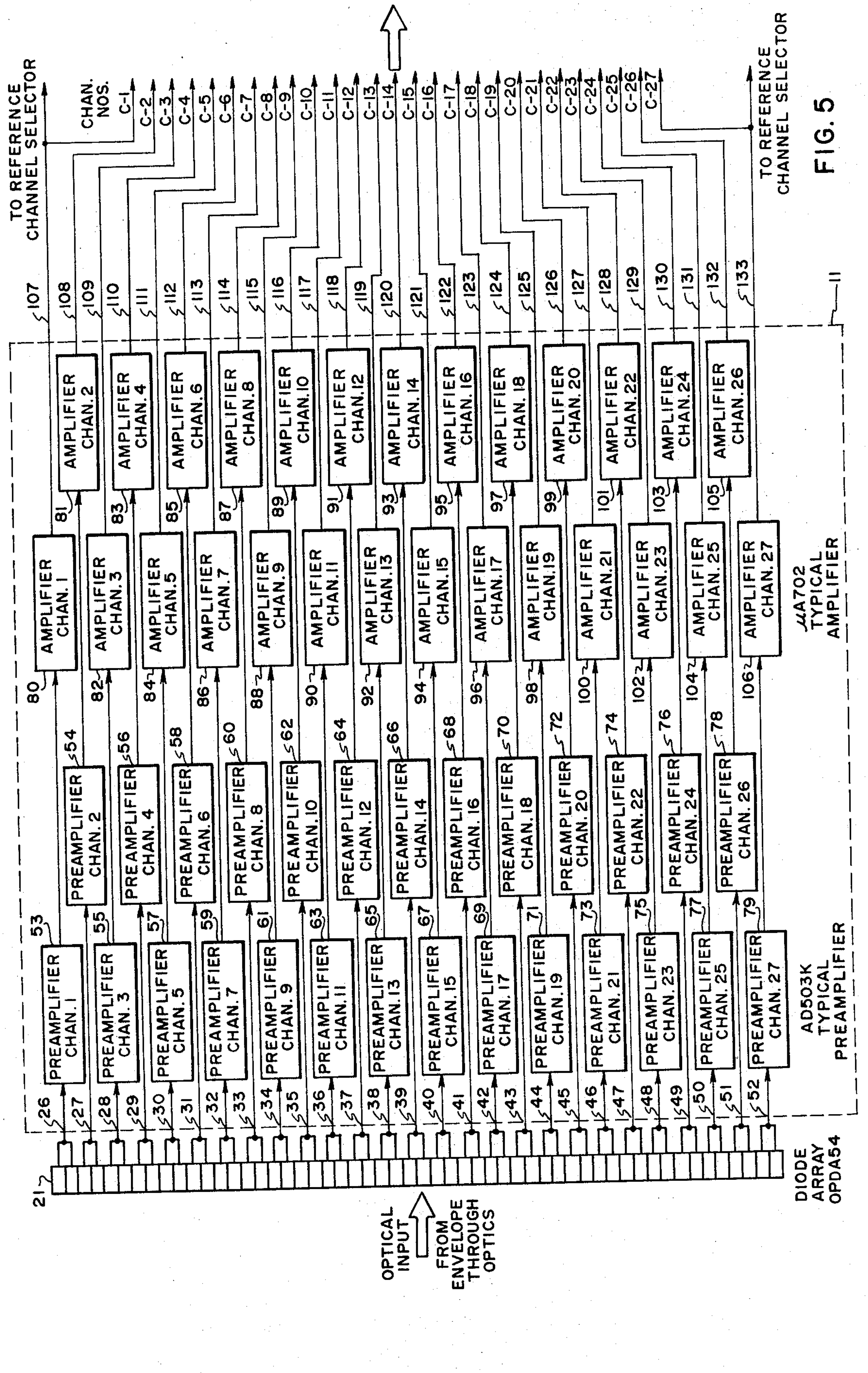
FIG. 5 is a more detailed block diagram of a portion of the system illustrated in FIG. 1.

The photodiode array 21, which may be a type OP-DA54, obtainable from Optron Incorporated of Carrollton, Texas is located so that its long axis will be substantially parallel to the long axis of the bars and half bars of the code 18 and it is used to convert the optical information into electrical signal so that electronic processing can take place. As illustrated in FIG. 5 the individual anodes of all the 54 diodes within the array 21 are brought out of the package and are grouped into adjacent pairs so that only 27 individual photodiode wires are brought out for further processing. In other words, the 54 anodes are connected so that if the 54 diodes were counted from the "bottom" up, the first and second diodes would be electrically connected together to form a longer photodiode element, which would still be of the same width as the original photodiodes and the third and fourth photodiodes would be electrically connected together to form another longer photodiode element, which would still be of the same width as the original photodiode element. This process is continued so that only half the number of the original photodiode elements are available as individual resolution elements. The 54 element linear photodiode array is thus formed into a linear 27 element photodiode array, with 27 equivalent individual anode leads brought out for further processing. These 27 anode leads are designated by the numbers 26 through 52.

It will be recognized by those skilled in the art, that different configuration diode arrays are available and could be used. Different classes of input transducers can also be used, such as a flying spot scanner and photomultiplier tube, or a vidicon.

As illustrated in FIG. 5, the input amplifier 11 takes the low level signals from the photodiode array 21 which are individually brought out on leads 26 through 52, through the respective preamplifiers 53 through 79, and the respective amplifiers 80 through 106 to convert the impedance and voltage level of the signals such that the input analog signals are now available for further electronic manipulations on leads 107 through 133. Components which can be used for the pre-amplifiers 53 through 79 are operational amplifiers type AD503K manufactured by Analog Devices of Norwood, Massachusetts, used in a current in voltage out configuration with a transfer gain of 2 volt output per microampere input. Components which can be used for the amplifiers 80 through 106 are Fairchild Semiconductor devices type $\mu$ A702 obtainable from Fairchild Semiconductor of Mountain View, California, used for non-inverting voltage amplification, with a gain of approximately 100. Additional circuit details such as those for frequency response shaping, grounding, and shielding of the amplifiers, will be obvious to those skilled in the art and have been omitted for clarity.

Since each individual signal lead 107 through 133 contains electrical information read by its corresponding diode element of the array 21 the spatial relationship of the signal lead's information content, relative to the other signal lead's information content, is determined by the spatial relationship of the 27 individual elements within the diode array 21. Thus, the signal due to the lowest point seen on the document or envelope 17 by the diode array 21 can and will be considered as being in channel C–1 and will be available on signal lead 107. Channel C–2 and the signal available on the related signal lead 108 will be representative of the next higher point seen on the envelope 17. The other adjacent, ascending, and sequential points on the envelope, as seen by the linear photodiode array 21, can be assigned consecutive channel numbers so that the highest point seen on the envelope is seen by channel C–27 and the related signal is available on lead 133. This ordered channel numbering system will be used in identifying these signals. The outputs on leads 107 through 133 from the input amplifier 11 now form the input to the input conditioner 12.

Figure 6:
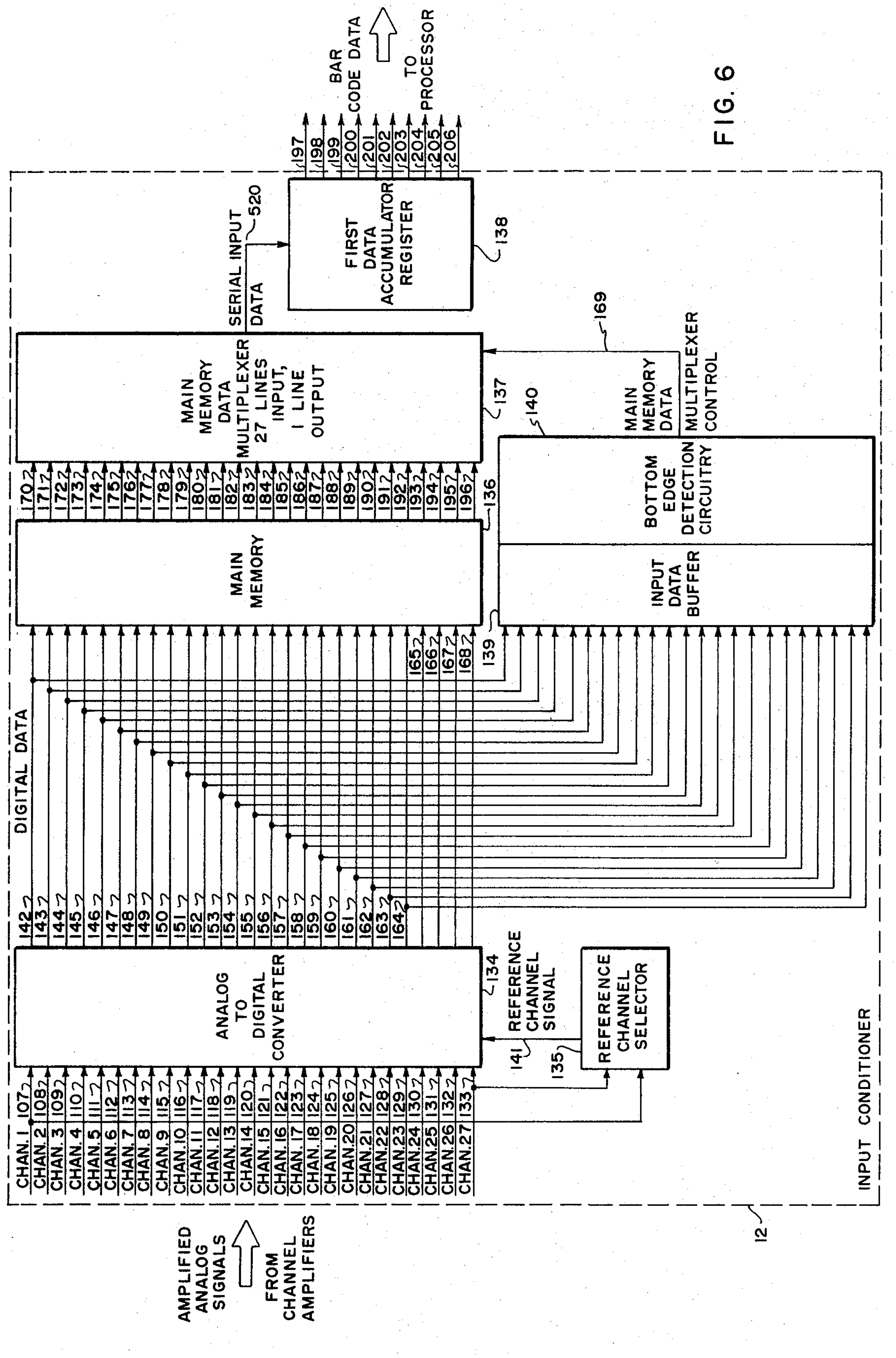
FIG. 6 is a more detailed block diagram of a portion of the system illustrated in FIG. 1.

The purpose of the input conditioner 12 is to take the electrical signals on leads 107 through 133 from the amplifiers 80 through 106 and to convert these analog signals to digital signals, to find the channels containing the bar code information, and to send the digital information from only those channels containing bar code information to the processor 13 for further data manipulations. The objectives of this pre-processing will be to make simple decisions at each point so that the overall data processing accuracy can be maintained. To achieve these objectives, simple data steering will be used, as opposed to the usual re-alignment of data with respect to itself, that makes the data conform to a perfect data pattern. As illustrated in FIG. 6, the input conditioner comprises an analog to digital converter 134 which receives the signals available on leads 107 through 133, a reference channel selector 135 which receives the signals on leads 107 and 133 which correspond to the respective lead channels C–1 and C–27, a main memory 136 for receiving the output from the analog to digital converter, a main memory data multiplexer 137 for receiving the output from the main memory, a first data accumulator 138 for receiving the output from the main memory data multiplexer, an input data buffer 139 for receiving certain signals from the analog to digital converter, and bottom edge detection circuitry 140 for receiving information from the input data buffer and for providing information to the main memory data multiplexer.

Pre-processing of information in the input conditioner 12 starts with the simple determination of whether or not printing was viewed by the photodiode array 21. To make this determination, a reference signal proportional to the envelope background surrounding the bar code must be found. The optical field of view of the photodiode array 21 is longer than the longest bar height, to allow for bar code and envelope misalignment. Due to possible misalignment, a signal representing the bar code can now be assumed to be present at most on either the bottom signal channel lead 107 or the top signal channel lead 133, but not both. The reference channel selector 135 generates the reference signal output which will be present on lead 141, and uses as inputs the analog signals from the two leads 107 and 133 corresponding to the two end channels. The reference channel selector 135 compares the signals on leads 107 and 133 and uses as its output the signal from either one of the two channels which has the larger amplitude signal. The reference output signal on the conductor 141 is also conditioned by the reference channel selector 135 so that its amplitude is at least equal to the highest of the analog signals present on conductors 107 through 133 out of the input amplifier 11. The reference signal on the conductor 141 is used as the reference input to the analog to digital converter 134. In the analog to digital converter 134, an amplitude comparison is made between the amplitude of reference signal present on the conductor 141 and all the amplifier signals present on conductors 107 to 133 which are inputs to the analog to digital converter 134 to determine whether or not any printing is in the field of view of the photodiode array 21. The analog to digital converter 134 generates a digital 1 or a digital 0 output where a 1 represents printing and a 0 represents no printing for each input signal on the conductors 107 through 133 and the appropriate digital 1 or 0 output signals are conveyed on the respective conductors 142 through 168. The individual channel signals on the conductors 142 through 168 are now in standard binary form, suitable for logic components.

The next task that the input conditioner 12 must perform is to locate the bar code digital signals on the conductors 142 through 168. To accomplish this task, all signals from the bottom-most 23 channels present on the conductors 142 through 164 are examined for bar code digital information by being fed into the input data buffer 139 for temporary storage, and then to the bottom edge detection circuitry 140. The output on the conductor 169 from the bottom edge detection circuit 140 is a binary representation of the 10 channel members containing the bar code data. Ten channels are used to encompass the bar code data in the vertical dimension instead of the maximum eight channels, to provide a tolerance in the bar code data location operation. An extra signal channel was provided on either side of the located bar data, hence the 10 channels. These binary signals now serve as the control signals for the main memory data multiplexer 137 which serves to serialize the data from the main memory 136. Time is required to be able to locate the channels associated with the bar code data. To prevent the premature steering of data to the first data accumulator register 138, temporary storage of all of the channel's data is required. Those skilled in the art will immediately realize that this temporary storage would not be required if the input transducer used as a vidicon or a flying spot scanner/photomultiplier tube combination instead of a linear photodiode array. However, a linear photodiode array 21 is used in this preferred embodiment and thus temporary storage is required. The temporary storage is provided by shift registers, so arranged such that the main memory 136 is formed.

The information from the main memory 136 is fed into the main memory data multiplexer 137 on conductors 170 through 196 which in turn serializes the data and feeds it to the first data accumulator register 138. The output data from the first data accumulator register 138 on conductors 197 through 206 now contains the bar code information plus some information from each channel adjacent to those found with bar code data. These additional channels serve as a safeguard for errors that might have occurred in the bottom edge detection circuit 140. The output data from the first data accumulator 138 present on conductors 197 through 206 now forms the input for the processor 13.

With the binary data representing the encoded bar code data assembled in the first data accumulator 138, the next task is the processing of the bar code data that will result in a bar code information output. The three tasks accomplished in the pre-processing operations to this point were: a simplified, on-line analysis of the analog input data in order that each input data sample was encoded to one binary bit so that the 1/0 encoding of the data represents a printing/no printing determination was possible; a search of all the sequential input data samples and identification of the channels that contain the bar code data signals; based on the identification of the channels that contain the bar code signals, a steering of input data samples was accomplished so that bar code data is now available for processing. As has been the goal in the implementation of this invention, simple decisions and operations have been required at all data handling steps. Simple, highly accurate processing steps have been used to achieve and enhance accuracy in this invention. An additional method this invention uses to further improve the processing accuracy is to assume that pre-processing errors are present in the input data to the processor and to take measures that reduce the sensitivity of the system to small numbers of errors in the input data so that the probability of errors during later processing operations will not be increased.

The pre-processing operations can lead to two types of errors; errors in the input data binary encoding or inaccuracies in the bar code data locating. The sensitivity to inaccuracies in the bar code data location is minimized by the inclusion of the two signal channels adjacent to the signal channels with the signal channels that were identified as containing bar code signals. Sensitivity to an error in the encoding of a bar code signal bit is minimized by using all the bits to determine the result of the next processing step, the next processing step being to assign the input data into its most likely classification. By using all the bar code binary bits to make a classification decision, the equivalent error rate associated with the classification operation is improved since the probability of an erroneous classification of the input data is equal to the probability that $m$ bar code bits were encoded incorrectly, at the same time. The number of bar code bits $m$ is defined as the minimum number of bits that must be changed so that a change in data classification from one major catagory to another will take place; for the bar/half bar optical reader, the major catagories for data are a 1 and 0 bar catagory. Since the binary encoding for each bit is made independently, an error in one encoding operation will not increase the probability of an error in encoding another bit in that same group of input samples. Hence, if $P(E)$ is the probability of an error in one encoding operation that was determined from ratio of the 1/0 decision threshold point to the equivalent RMS noise level of that encoding operation, the probability of the $m$ encoding operations being in error is $[P(E)]^m$, since all errors are independent. The direct result is an improvement in the input data classification error rate.

Additional embodiment of the processing accuracy can be incorporated by the selection of a proper input data classification scheme. By starting with an ideal input bar code input data pattern and using it to establish classifications for these perfect data patterns, any other bar code input data pattern can be assigned on the basis of an a-priori determination to that class of ideal bar code input data patterns which has the highest probability of deteriorating into the input data pattern being classified. Hence, the total probability that a classification error will occur is the joint probability that two independent errors were made, the errors being $m$ bits being encoded wrong, $[P(E)]^m$, and the probability that an off-line, a-priori analysis and classification of the input data was incorrect. The probability of errors in the a-priori analysis and classifications can be arbitrarily small since computer simulation techniques as well as empirical determination of actual input data pattern classifications can be used. The results of the a-priori data classifications are stored in memories within the reader system and the input data pattern is used to address and retrieve the classification results from within the memories. The memories used could be that class of memories known in the computer art as Read Only Memories. The probability of an error associated with a data processing cycle are traded for the probability of an error of a table look-up operation, a trade that results in the reduction of the probability of an error by several orders of magnitude. The classification of the ten bits representing a sample of the character being read would now be represented by another binary number which is an encoding of the results of the first input data classification operation, and requires fewer binary bits since all binary states would be used. This first classification is defined as a first generation input data classification of a portion of the character being read and is accomplished by the first data encoder 207.

Unlike the data processing systems previously used, in which all the first generation input data classifications are not accumulated until the complete character has been read, and then used to determine what character was read, only a few first generation classifications are accumulated and used to generate a second generation classification of the input data patterns. The accumulation and use of several intermediate input data pattern classification to form several generation input data patterns allows not only increases in data classification accuracies but, through the use of binary codes for all intermediate results, a very efficient use of memory storage capabilities is also achieved, which then permits the storage of more results of input data analysis and classifications. The more results that are stored, the less the requirement for the more expensive on-line analysis to input data pattern characteristics. Since the input data samples used to generate the first generation input data classification did not have the complete data from the bar being read three sequential first generation input data classifications are accumulated in a second data accumulator 208. The data classifications are just shifted into the accumulator, with no other data modification required.

A second generation input data classification is accomplished with a second data encoder 209. As was the case of the previous input data classification operation, the probability of an erroneous classification at this point is the probability that enough sequential first generation classifications were in error so that a wrong classification results, and is the equal to the square of the probability that a first generation classification was in error since two of the three first generation classifications must be in error before a wrong second generation classification is made. The second generation classification of input data is based on more input data samples than the first generation input data classification and is again based on which of the ideal input data pattern sequences is most likely to deteriorate into the input data pattern being classified. The second generation input data pattern does not have all the bar's samples, so an additional second generation input data classification accumulations must be done and a third generation input data classification must be done. The accumulation is done in the third data accumulator 210 and the third generation input data classifications are generated in the third data encoder 211, using the same criterion as was used for the previous input data classification.

The number of the accumulators and encoders is determined by the amount of the character being read that must be sampled before the ambiguity in the input character's identity can be reduced to an acceptable level. For the bar/half bar reader, three generation guesses of the input data pattern were required before a bar could be identified with an acceptable level of ambiguity. A processing scheme can be formulated as described in this invention that requires no on-line calculation of input data characteristics, that makes efficient use of memory capabilities, and needs only to be changed in the way the printing/no printing sequential inputs are classified if the input character font changes.

Figure 7:
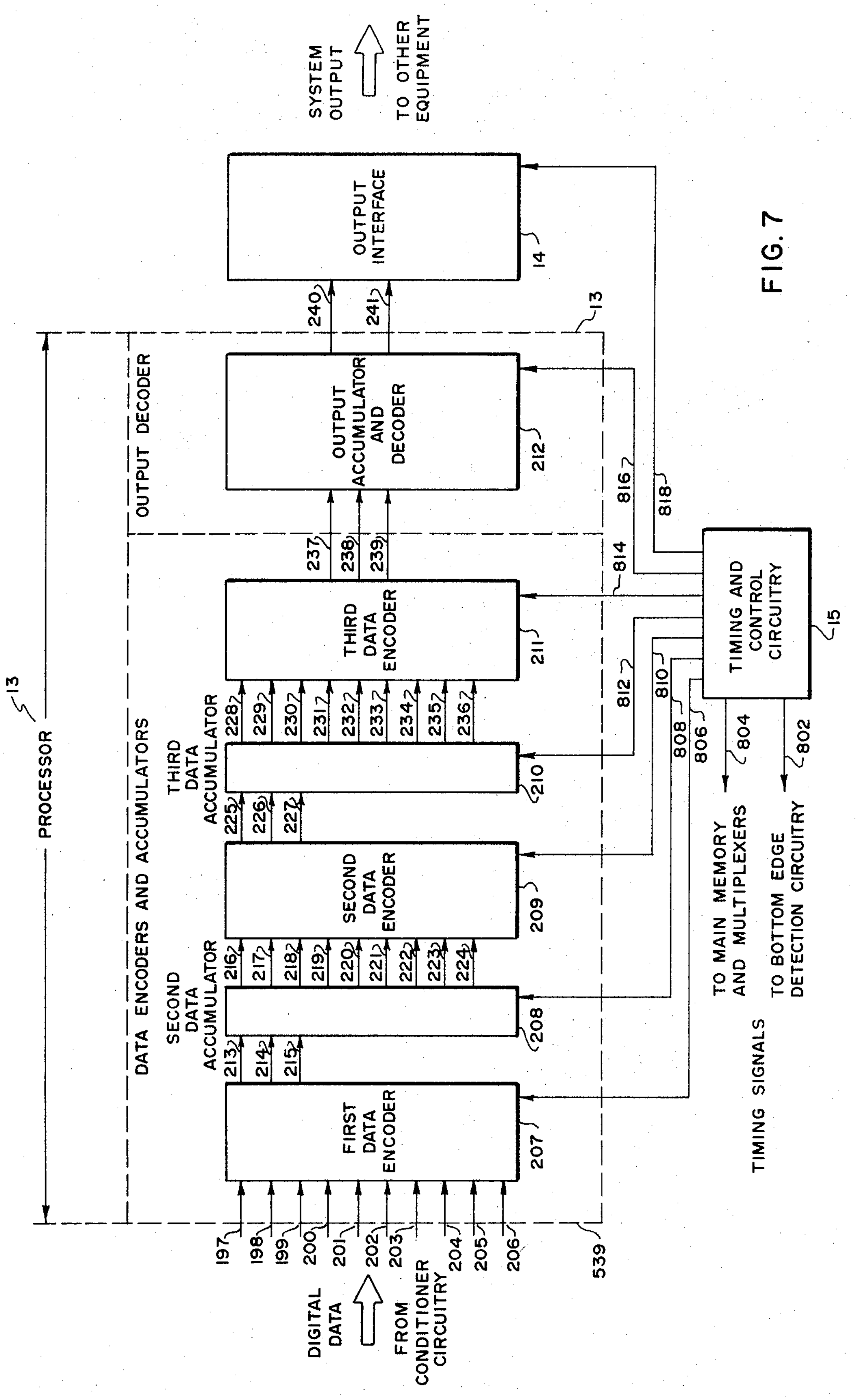
FIG. 7 is a more detailed block diagram of a portion of the system illustrated in FIG. 1.

As illustrated in FIG. 7, the processor 13 comprises a first data encoder 207 which receives its input from the input conditioner 12, a second data accumulator 208 which receives information from the first data encoder, a second data encoder 209 which receives information from the second data accumulator, a third data accumulator 210 which receives information from the second data encoder, a third data encoder 211 which receives information from the third data accumulator and an output accumulator and decoder 212 which receives information from the third data encoder. It should also be noted that the timing and control section 15 is connected to the encoders 207, 209 and 211 and the accumulators 208 and 210 plus the output accumulator and decoder 212. The purpose of the processor 13 is to determine whether its inputs represent a full bar, a half bar, or an "in between bars" brought about the input bar/half bar data pattern and to generate an output that best described the input state. The processor 13 must also make allowances for as many errors as possible in all the preceding data-handling steps.

By using a series of data encoders 207, 209 and 211, and data accumulators 208 and 210, a time history of the input can be formed and a most likely cause for the input data pattern established. The input to the processor 13 is the data present on conductors 197 through 206 from from the first data accumulator 138. This data is fed to the first data encoder 207 where, according to an a-priori determination, a three bit binary code is generated that describes the most likely cause of that input data pattern and is sent to the second data accumulator 208 on the conductors 213, 214 and 215. An ideal input data pattern would be assumed, such as that resulting from viewing a long or short bar, with or without skew, or by viewing in-between the bars. Variations on the data patterns would be permitted and would be assumed to be caused by degradations in the bar code, in the electronic data manipulations, or in the mechanical handling of the envelope 17.

The data patterns resulting from these assumptions would be assigned to one of the eight possible classes of inputs that would reflect the most likely primary cause of the data pattern until a cause assignment has been made for all possible input data variations. Stated another way, an a-priori maximum likelihood cause would be assigned to each data pattern. The eight input states possible with a three bit binary code are: 000, no data or in-between bars; 001, a short bar; 010, or a long bar; 011, or not enough data to determine whether a long or a short bar was present; 100, data indicating that a skewed pattern was present but that the input was similar to that which would be obtained when the reader looked in-between bars in a skewed data pattern; 101, a short bar in a data pattern that indicates skew; 110, a long bar with enough extra data to indicate a skewed condition; 111, the data pattern is such as to make it impossible to determine accurately whether or not a long or a short bar is present, since there is too much data for a short bar, and a skewed data pattern condition is obvious.

The three bit code present on the conductors 213, 214 and 215 which is the output from the first data encoder 207 and represents the encoded most likely primary cause of the input data is the input to the second data accumulator 208. The second data accumulator 208 has room to store three outputs from the first data encoder 207 of three bits each, for a total storage of nine bits. The three stored outputs in the second data accumulator 208 will correspond to the last three outputs generated by the first data encoder 207. Hence, when a new output from the first data encoder 207 is generated, the oldest output from the first data encoder which is stored in the second data accumulator 208 is discarded. The earlier two outputs from the first data encoder 207 which is stored in the second data accumulator 208 are shifted down the three bit positions corresponding to one stored output within the second data accumulator 208 and the newer output from the first data encoder 207 is entered into the first data accumulator.

Three successive first data encoder outputs are now available in the second data accumulator 208 for use as inputs to the second data encoder 209, and they are sent to the second data encoder on the conductors 216 through 224. In the second data encoder 209, three new bit outputs are generated that represent the most likely cause of the second encoder's input data. For example, the second encoder's input data pattern could have represented a data pattern caused by a short bar, short bar and no bar, the no bar being the oldest output accumulated in the second data accumulator 208. The bit pattern would have been 001, 001 and 000. Once again, making allowances for errors, the most likely input cause for that data pattern is a short bar, and that code would be the answer generated by the second data encoder 209 which will be present on conductors 225, 226 and 227 for the example shown.

The previous coding scheme can be used again for the output data from the second encoder. As before, the three bit code would be used as the latest input into the third data accumulator 210. Bit shifting would be accomplished in the same fashion as in the second data accumulator 208, and, from this latest accumulator 210, a new input would be formed and sent to the third data encoder 211 on the conductors 228 through 236. The third data encoder 211 generates an answer which is conveyed on conductors 237, 238 and 239 that represents the most likely cause of its input data pattern. The output data from the third data encoder 211 in the conductors 237, 238 and 239 would now correspond to one of four possibilities, such that a 100 represents "no bars", a 010 represents a long bar, a 001 represents a short bar, and a 011 represents a long or a short bar. The last category, 011, represents the case where data was found but a good determination could not be made as to whether a long or a short bar was present. The data out of the third data encoder 211 which is conveyed on conductors 237, 238 and 239 serves as the input to the output accumulator and decoder 212.

The purpose of the output accumulator and decoder 212 is to accept data from the third data encoder 211 to manipulate the data, and to form a final best estimate of the cause of the input data bar/half bar pattern viewed by the optical system 22. The output accumulator and decoder 212 serves to not only provide a 1 to 0 output corresponding to a bar or half bar on conductor 240, but also to provide an indication on the conductor 241 that valid data is now available. Output Interfacer 240 uses the signals on these conductors 240 and 241 to accumulate and format the information into usable information. To continue enhancing accuracy in reading, the probability of errors in the data encoding must still be considered. The redundancy in input data, which in other processing systems may cause problems, can be used to advantage here. As data is made available from the third data encoder 211, a count is kept in the output accumulator and decder 212 of the types of answers generated. An indication is given on conductor 241 that valid data was available until a pre-determined number of "no bars" had been generated and sent to the output accumulator and decoder 212 by the third data encoder 212. The pre-determined number of "no bars" is set by considering the variations and errors in the pattern of the bar code and in the previous components of the system. When the pre-determined number of "no bars" answers have been received, the number of long bar and short bar answers received is compared in the output accumulator and decoder 212 and the greater number of answers is used as the correct answer. Thus, if four erroneous short bar answers had been received and five correct long bar answers had been received by the output accumulator and decoder 212 (an extremely poor error rate), the larger number of long bar answers would have been used to generate a 1 answer.

Figure 8:
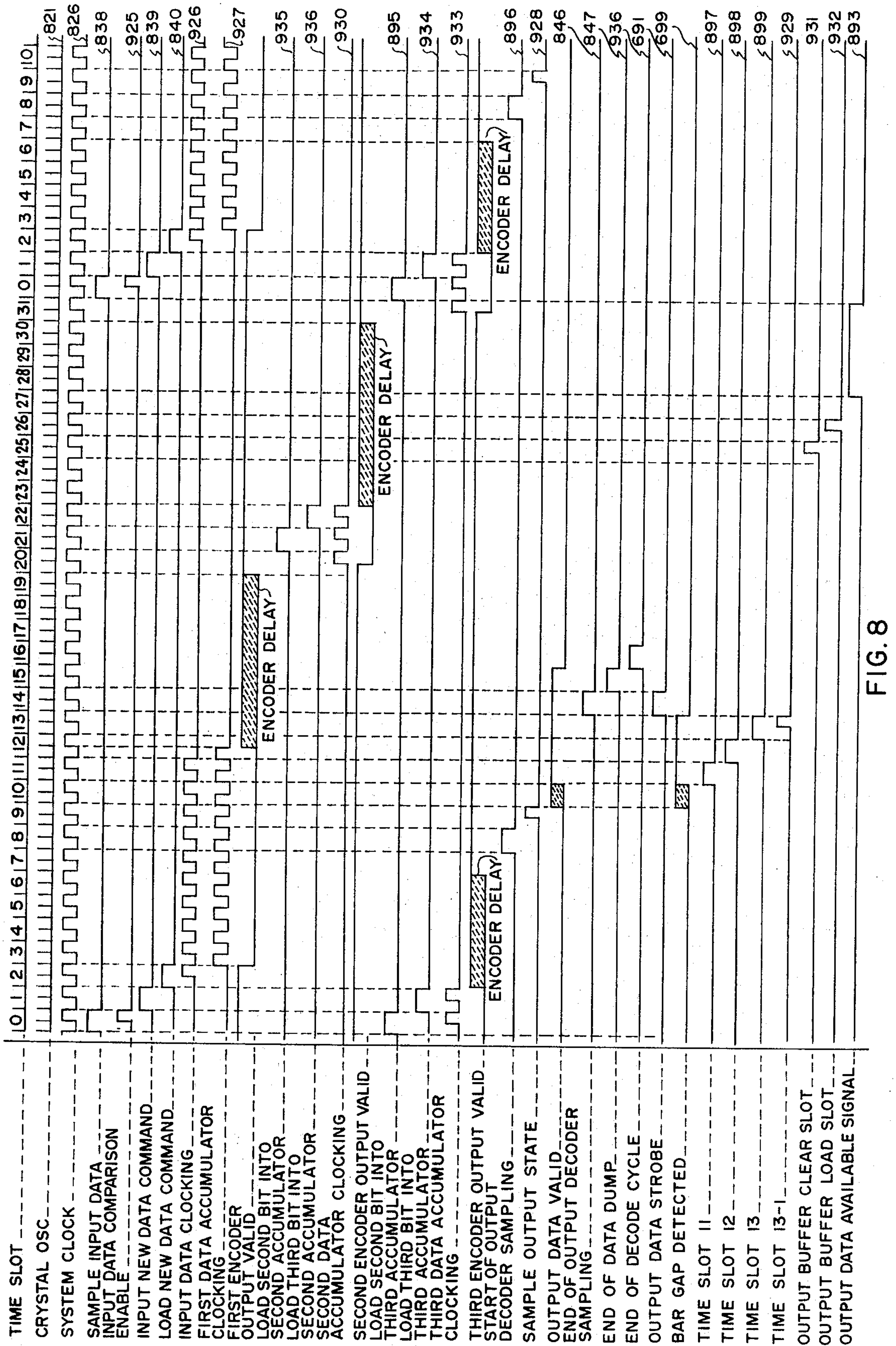
FIG. 8 is a timing diagram illustrating the sequence of operations of the invention.

The timing and control section 15 as illustrated in FIG. 1 is used to properly sequence the processing steps that have to occur at each point in the system and the timing sequence is illustrated in FIG. 8. The basic system clocking frequency is set by a crystal oscillator 16 whose frequency was divided down to a reader operation cycle. A reader operation cycle is defined as that interval of time, measured in number of crystal oscillator cycles, within which all the operations that occur in the processing an input data sample are performed once within the reader system. As shown in FIG. 8, a reader operating cycle is subdivided into thirty-two time slots, each time slot being equal to two crystal oscillator periods. The sequence of operations for this invention starts when the encoded bar code data is clocked into the system by the Sample Input Data clock and is then compared with the previously admitted bar code data during the time the Input Data Comparison Enable signal is available. After the input data is compared with the previous sample, an Input New Data Command signal now admits new data into the input data buffer 139 and the main memory 136. A Load New Data Command signal is next used to set the bottom edge for detection circuitry output on conductor 169 to the first channel number that contains bar code data; the 10 Input Data Clocking signals are used to cause the output on conductor 169 from the bottom edge detector circuit 140 through the 10 binary states which represent the 10 signal channels that contain bar code data. The 10 First Data Accumulator Clocking signals are used to shift input bar code data into the first data accumulator 138. The next interval of time is the time allowed for any read only memory, or other device that is being used as the first data encoder 207, to accept its input from the first data accumulator 128, and to generate an output on the conductors 213, 214 and 215 to the second data accumulator 208. The next operation is to load the output of the first data encoder 207 into the second data accumulator 208 through the use of the control signals that generate the command called Load Second Bit into the Second Accumulator, and Load Third Bit into the Second Accumulator and serve to change the output of the first data encoder 138 from parallel to data to serial data for clocking of all three bits on conductors 213, 214 and 215 into the second data accumulator 208 by the Second Data Accumulator Clocking signal. The next interval of time is used to allow the second data encoder 209 to receive information from the second data accumulator 208 on conductors 216 through 224 and to generate an output to the third data accumulator 210 on conductors 225, 226 and 227. The output from the second data encoder 209 on conductors 225, 226 and 227 must now be changed into a serial form for shifting into the third data accumulator 210 through the use of the control signals called Load Second Bit into the Third Accumulator, and Load Third Bit into the Third Accumulator, causing the first bit to be automatically loaded into the third data accumulator 210 by the Third Data Accumulator Clocking signal. As indicated, new data is being brought into the system during the time that the data from the second data encoder 209 was being shifted into the third data accumulator 210 since the numbering of the time slots went past zero but, since the operations do not interfer with each other they can continue in parallel. The next time interval is used to allow the third data encoder 211 time to receive information from the third data accumulator 210 on conductors 228 through 236, and to generate an output to the output accumulator and decoder 212 on conductors 237, 238 and 239. The next operation causes the output of the third data encoder 211 be accepted into the output accumulator and decoder 212 through the use of a Start of Output Decoder Sampling signal, then to make a determination if a valid output should be generated through the use of a Sample Output Command signal. Those skilled in the art know that some time interval should be used to allow some time for the decision making process to occur and the data out of all conductors to stabilize; a time interval equal to one reader time slot was used to allow data to stabilize. The output accumulator and decoder operation can now end with the commands called End of Output Decoder Sampling, End of Data Dump, End of Decode Cycle, and, if a valid output was generated from the output accumulator and decoder 212 on conductor 240, an Output Data Strobe signal on conductor 241 must be generated so that an output data valid indication can be given. An indication that the processing of a bar has been completed, called a Bar Gap Detected signal, is now given to the bottom edge detection circuit 140 so that the starting point for the bar code data location can be updated during the reader operating time slots 11, 12, 13 and 13–1, the 13–1 time slot corresponding to the second half of time slot 13. In any output interface A that is used to convert either signal levels, or signal formats, the output from the output accumulator and decoder 212 on conductors 240 and 241 may be used as the control signals to accept and accumulate output data. If the output data format must be changed, an output register to accept data may be required, an output buffer to hold the output data as more new data is being read may also be required, and an Output Data Available signal may be required. As indicated in the timing diagram in FIG. 8, these Output Buffer Clear, Output Buffer Load, and Output Data Available signals have been successfully used.

The analog-to-digital converter 134 must have some criterion to determine whether a binary 1 or a binary 0 should be generated. In keeping with the simple operation requirement at each decision-making point, a printing/no printing decision was all that was required at this decision-making point. Printing was defined as being present when the reflectance of the envelope 20 surface, as seen by a photodiode element 21, was less than some percentage of the background of the envelope. The reflectance percentage used was 75 percent, and was determined by the inking and printing degradations encountered in some code bar patterns. A different percentage value may be used, depending on the application, as is obvious to those skilled in the art. The output 163 of the reference channel selector 161 in FIG. 6 is a signal proportional to the background of the envelope.

Figure 9:
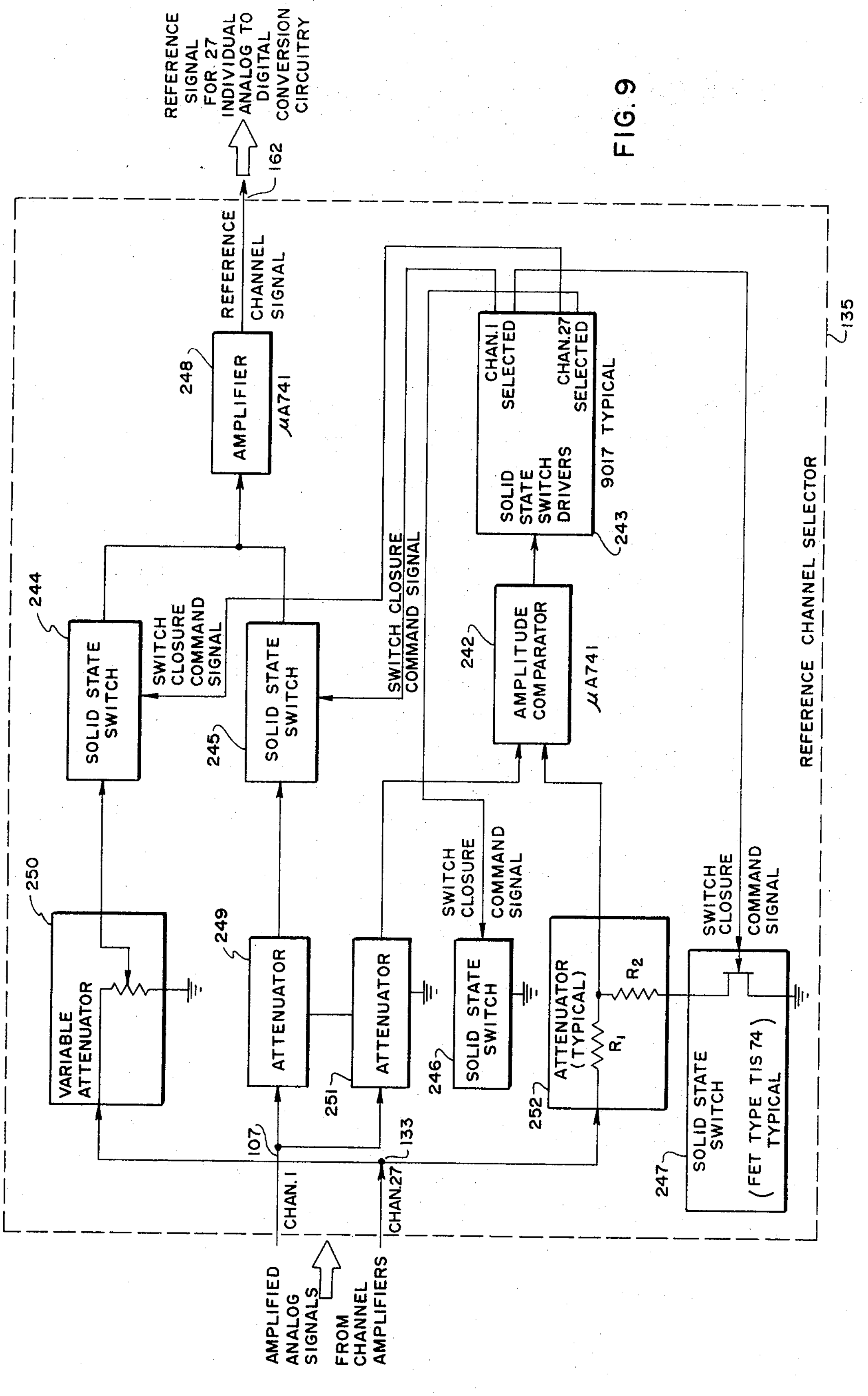
FIG. 9 is a more detailed block diagram of a portion of the system illustrated in FIG. 6.

The details of the reference channel selector 135 are illustrated in FIG. 9. The inputs to the reference channel selector 135 are the analog signals from the two end channels corresponding to the conductors 107 and 133. As previously indicated, the optical vertical field of view of the optics system 22 is larger than the nominal 0.110 inch long bar to allow for misalignment of the bar code on the envelope 17 with respect to the optical axis of the system. However, the optics system 22 and the diode array 21 are arranged so that the bar code will only result in the generation of a signal on the top channel corresponding to the conductor 107 or on the bottom channel corresponding to the conductor 133, but not on both. Since, within some specified optical spectral region for the application, printing will have a lower reflectance than the background, a comparison is made of the signal amplitude on the conductors 107 and 133 in an amplitude comparator 242 to determine which signal on the conductor 107 or 133 corresponds to the lower reflector resulting from printing being present. The comparator's output feeds some drivers 243 which in turn can be used to drive some single-pole, single throw switches, or their solid state equivalents 244, 245, 246 and 247. The two switches 244 and 245 select either of the two end channel signals 107 or 133 based upon the amplitude comparison which is made in the amplitude comparator 242 and to pass that signal into an amplifier 248 to generate th required reference channel signal on the conductor 141.

To permit switching from either one of the end channels to the other without changing the overall proportionality relationship of the signal from either channel conductor to the reference signal, a fixed alternator 249 and a variable attenuator 250 are used so that any unbalance in the end channel gains may be nulled out. As is obvious to those skilled in the art, when the amplitude comparison is made in the comparator 242, some hysterisis must be introduced into the comparison decision switching to minimize any oscillatory mode of operation. The simple switching by the switches 246 and 247 of the attenuators 251 and 252 in and out of the signal input path of the amplitude comparator 242 introduces the required hysteresis. FET devices such as Texas Instruments TIS74 have been used successfully for the solid state switches 244, 245, 246 and 247. Attenuators made up of discrete resistors for some percentage attenuation, such as the 80 percent were used for the attenuators 249, 251 and 252 and a potentiometer was used to form a variable attenuator 250. Fairchild Semiconductor devices type A741 and another Fairchild Semiconductor logic element, such as 9017, used between −7VDC and −12VDC, have been used respectively for the comparator 242 and for the solid state switch drivers 243.

Figure 10:
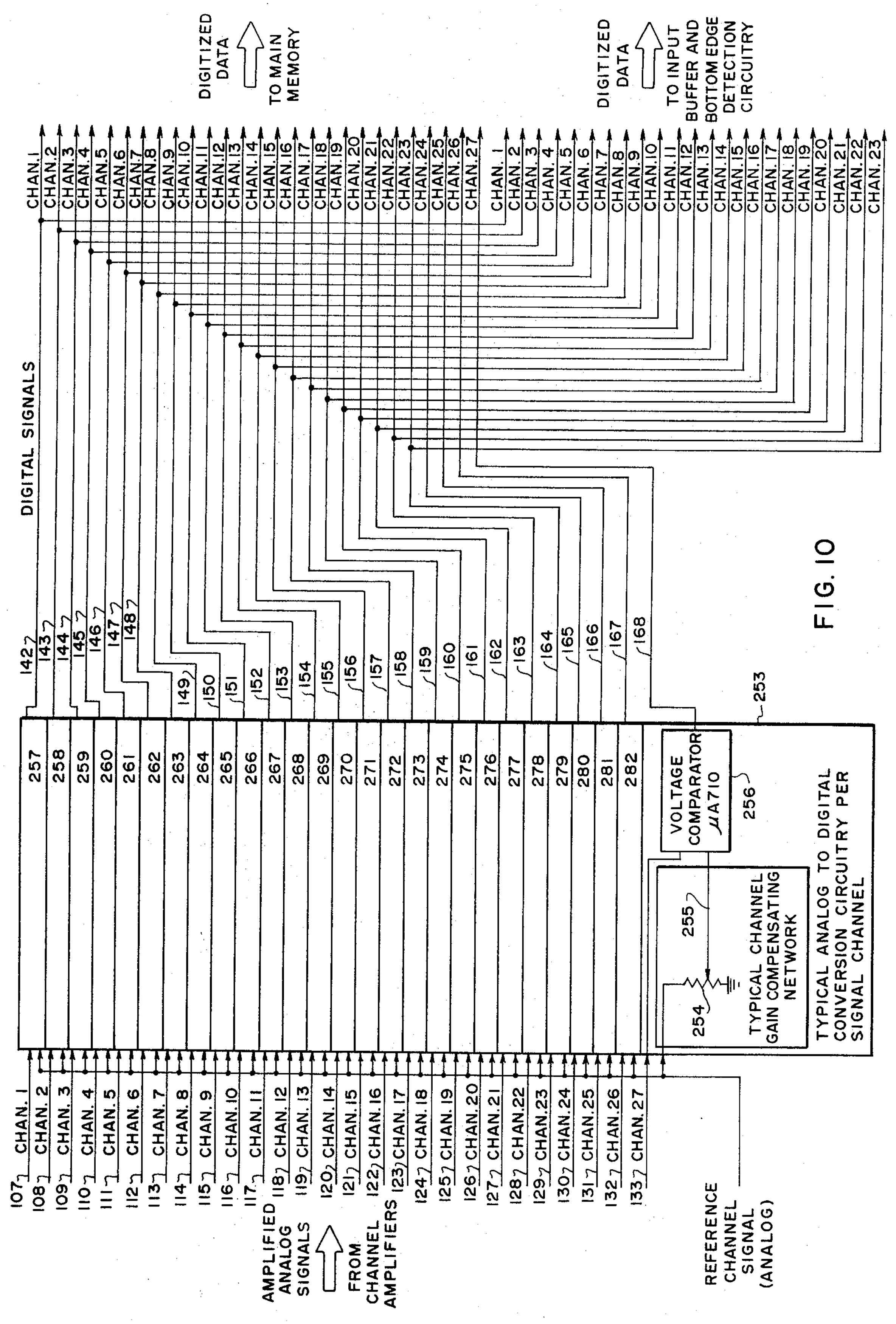
FIG. 10 is a block and circuit diagram of a portion of the system illustrated in FIG. 6.

Further details of the analog to digital converter 134 of FIG. 6 used in the input conditioner 12 of FIG. 1 are illustrated in FIG. 10. If the amplitude of the channel signals on the input conductors 107 through 133 is less than 75 percent of the reference signal on the conductor 141, printing is determined to be present by the analog to digital converter 134; if the converse is true, no printing is present. A simple voltage amplitude comparison is made by the analog to digital converter 134 and a printing/no printing decision, logic 1/0, is made. The analog to digital circuitry 253 will be discussed in relation to the signal present on the conductor 133 which corresponds to channel 27 since the analog to digital circuitry will perform in the same fashion with respect to the signals present on the other conductors 107 through 132. Some uniform scene can be assumed as being focused on the entire input photodiode array 21 so that the signal on the conductor 133 and the reference channel signal on the conductor 141 are due to a scene having the same reflectance coefficient.

Since the reference channel signal on conductor 141 was amplified in order to be at least as large as the largest channel amplitude signal on the conductor 107 through 133, the channel signal on the conductor 133 will be equal to or less than the reference channel signal. A potentiometer 254 is connected to the conductor 141 and it allows the introduction of enough inverse gain, or attenuation, so that a particular channel's reference signal on the conductor 255 listing from the potentiometer to a voltage comparator 256 will be the required percentage of that channel's signal such as the signal on the conductor 133, previously established at 75 percent. Thus, as long as the ratio of the reflectance of the scene associated with that channel and the equivalent background reflectance represented by that channel's reference signal on the conductor 255 does not drop below the previously established 75 percent, a no-printing indication will be given. When that channel's scene reflectance falls below the 75 percent ratio, a printing indication is given as the output from the voltage comparator 256. At the 75 percent reflectance ratio, either indication is satisfactory. In order to adjust the potentiometer 254, a standard uniform scene or target is focused on the complete photodiode array 21 and the potentiometer is adjusted to a point where the reference signal on the conductor 255 is 75 percent of the channel signal on the conductor 133. It will of course be appreciated, that the potentiometer 254 can be adjusted to provide other percentages than the 75 percent ratio if it is desired. The remaining channel's analog to digital circuitry 257 through 282 is identical to that for the analog to digital circuitry 253. A Fairchild Semiconductor A710 voltage comparator is a suitable component for use as a voltage comparator such as the comparator 256 since it will accept analog voltage inputs and generate an output that is compatible with standard logic circuits.

Figure 11:
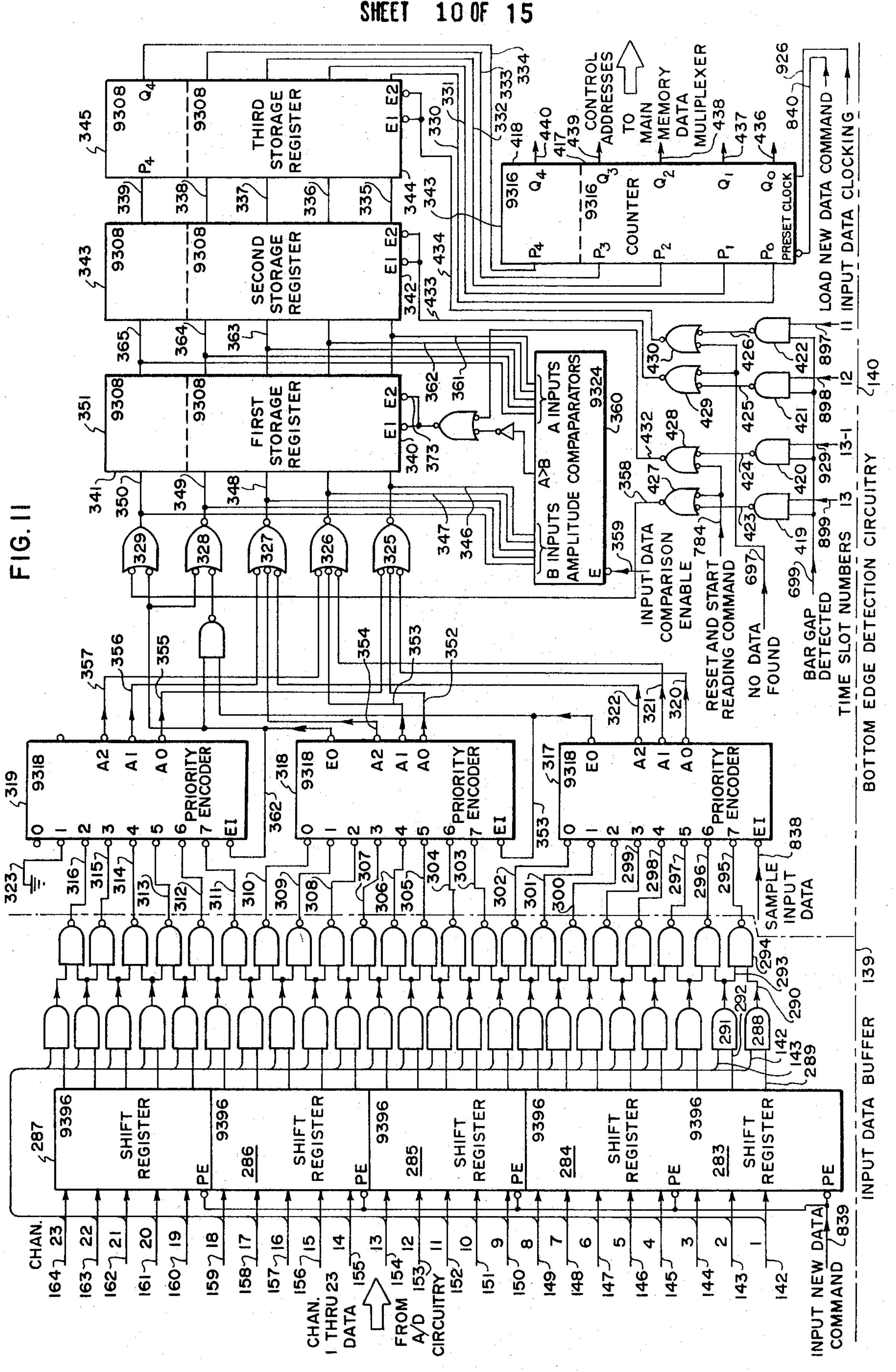
FIG. 11 is a circuit diagram of a portion of the system illustrated in FIG. 6.

Further details of the input data buffer 139 and the bottom edge detector 140 are presented in FIG. 11. As illustrated in FIG. 11, data on the conductors 142 through 164 is fed into several parallel-in, parallel out shift registers, 283 through 287 to yield a one reader operating cycle delay. Since all input data processing is identical, only the signal processing of the data on the conductors 142 and 143 corresponding to the channels C–1 and C–2 will be discussed. During the reader operating cycle time slot just prior to a input new data command, the 1/0 decision presently available as channel C–1 data on the conductor 142 is sent to the AND circuit 288 as is the data available on the conductor 289 which is the data available on the same channel during the previous reader operating cycle.

If a printing present decision, or logic 1, was available as indicated by the data on the conductor 289 and still is as indicated by the data on the conductor 142, a "Bar may Be Present On Channel C–1" indication on the conductor 290 is given by using the logical AND operation on these two data signals. The same logic AND Operation is performed by the AND circuit 291 on the channel C–2 signals on the conductors 143 and 292 to yield, if possible, another "Bar May Be Present On Channel C–2" indication on the conductor 293 logic AND operation. The two "Bar May Be Present . . . " signals on the conductors 290 and 293 are combined in the NAND circuit 294 to generate a "Bar Is Present On Channel 1" signal on the conductor 295. Thus, a spatial filter is formed that requires the presence of printing on at least two vertical input photodiode array 21 resolution elements, and it may also have printing during two consecutive horizontal sampling intervals. A spatial filter of the described configuration was found to successfully filter out the extra unwanted data in the bar code reader's field of view. All other inputs on the conductors 144 through 164 to the input data buffer 139 are similarly processed and "A Bar is Present" indication is generated on the conductors 296 through 316, if appropriate.

The generated signal on the conductor 295 is fed to a priority encoder 317, a device that takes eight ordered inputs and generates the binary number of the highest numbered input that was active. Stated another way, of the eight lines going to this encoder on conductors 295 through 302, if lines 2, 3 and 6 corresponding to conductors 300, 299 and 296 respectively, each had an active bit, the encoder would generate a binary number 6 on conductors 320, 321 and 322; if lines 2 and 3 corresponding to conductors 300 and 299 had active bits, the binary number 3 would have been generated on conductors 320, 321 and 322; if only line number 2 corresponding to conductor 300 had an active bit, the binary number 2 would have been generated. The priority encoders 318 and 319 are similar to the encoder 317. The particular device used for the encoders 317, 318 and 319 is a 9318 priority encoder, a standard component available from Fairchild Semiconductor, Inc. Those skilled in the art are aware that other similar devices or configuration are available.

The 9318priority encoders have the characteristic that when enabled with a low true signal, such as applying a 0 VDC signal to the EI (Enable Input), the inputs to the device are scanned for active, low true inputs. When the highest numbered active input is located, the binary equivalent of that number is generated as a low true signal output so that the binary representation of a low true binary 7 is 000. Conversely, by just reversing the meaning of the code that the device generates, the complementary high true code can be used so that the low true binary 7 is interpreted as a high true zero. Thus, the "Bar Is Present on Channel 1" signal on the conductor 295 sends an active bit to the priority encoder 317, and the code generated on the conductor 320, 321 and 322 would be, for low true signals a binary 7 or 000, and for high true signals, the 000 code would be a binary number 0. If, in the lower 9 channels corresponding to the conductors 142 through 150, the only active bit generated had been for channel 8, the only active input for the priority encoder 317 would have been its 0 input on conductor 302 and a low true zero with a binary code of 111, or its high true binary equivalent code for 7 would have been generated on the conductors 320, 321 and 322 as the data location. Had no inputs been active on that particular priority encoder 317, an EO signal would be generated so that the following priority encoder 318 would be activated. The operation of this following priority encoder 318 and the subsequent encoder 319 is identical to the first encoder.

The use of the priority encoders 317, 318 and 319 allows the automatic tracking of the bar code data. Since several contiguous channels will have all the bar code data, the priority seeking feature of the encoders will automatically identify one edge of the bar code pattern. Since the channels were organized so that the bottom of the bar pattern is towards channel C–1, the priority encoders 317, 318 and 319 will automatically seek the bottom edge of the bar code. The highest point allowed for the bar code bottom is the grounded input conductor 323 to the priority encoder 319 so that channel C–22 corresponding to the conductor 316 is automatically selected if no bar code data is found. Some means for keeping track of the bottom-most point of the data, for storing that location, for restarting a search for another bottom-most point of the data, and for deciding when to use the location of the stored bar code bottom location are also required. Obviously the location of the bar code is the binary number of the channel, or channel address. An additional task that must be accomplished is the logical combination of the data bottom addresses from all three priority encoders 317, 318 and 319. Logic gates 324 through 329 provide a way of accomplishing this function. Those skilled in the art are aware that the indicated logic interconnection for combining the addresses is one of several available. There are three classes of bar code data bottom addresses. There is one address associated with the particular bar data present at any one time on the conductors 330 through 334. There is another data address associated with bar data that may be in the main memory 136 (see FIG. 4) and is not yet available on the conductors 170 through 196. There is changing data address that changes as new input data becomes available to it. Storage locations are made available for these addresses and these are in the storage registers numbered 340, 341, 342, 343, 344 and 345 in FIG. 11. At the start of a reading operation, if none of the inputs to the priority encoders 317, 318 and 319 are active, a number 31 will be entered on the conductors 346 through 350 into a first storage register 351 and will be available on the conductors 361 through 365. The number 31 is generated by having the priority encoder output on the conductors 320, 321, 322 and 352 through 357 at a 1 state, while forcing the highest ordered bit on conductor 350 to a 1 through the generation of a reset and start reading command signal on conductor 358. When the next input data comparison enable signal is received on the input conductor 359 of the amplitude comparator 360, the number 31 on conductors 361 through 365 is compared with the number 22 generated by the last priority encoder 319, caused by its grounded input on conductor 323. The amplitude comparator 360 determines that the stored address available on conductors 361 through 365 is higher than the incoming address on the conductors 346 through 350, so an enable signal is generated on conductor 351 so that the new lower number is entered into the first storage register 351.

Assuming no bar code data had been found up to this time, the signal on conductor 697 would be at a logic zero so that, acting through the logic elements 429 and 430, enable signals would be present on conductors 433 and 434, causing the address available on conductors 361 through 365 to also be present on conductors 330 through 334. As input data is found, an active input to the priority encoders on conductors 295 through 316, a better data address is generated on conductors 346 through 350, entered into the first storage register 351 and used as the bottom of the code on conductors 330 through 334. The stored data address is entered as the starting point for a modulo 32 counter made up of counters 417 and 418. The counter is present by the Load New Data Command on conductor 840 to the address available out of the third-storage register on conductors 330 through 334 and incremented by the 10 clock pulses that comprise the Input Data Clocking signals on conductor 926. The counter states on conductors 436 through 440 represent the channel numbers that contain the bar code data on conductors 134 through 160 in FIG. 9 and serve as the output of the bottom edge detection circuitry on conductors 436 through 440. When the data fed to the output accumulator and decoder 212 in FIG. 5 is interpreted as valid bar code information, the No Data Found signal on conductor 697 in FIG. 8 is removed removing the fixed enable signal on conductors 433 and 434, and normal operation of the second and third storage registers starts. When a data bit is generated out of the output accumulator and decoder 212 in FIG. 7 indicating that a complete bar has been processed, a Bar Gap Detected signal is generated and is made available to the bottom edge detection circuitry on conductor 699. The bar code data address in the second storage register available on conductors 335 through 339 is entered by the enable input signal on conductor 434 into the third storage register made up of components 344 and 345, for use as the next starting point of data steering on conductors 330 through 365. The latest bar code bottom edge address in the first storage register available on conductors 361 through 365 is entered into the second storage register by the enable signal on conductor 433. A new high address, number 31, is generated again and is entered into the first storage register 351 by the enable signal on conductor 374, and a new bottom edge address search starts. The series of address locations on conductors 436 through 440 generated by the 10 Input Data Clocking signals on conductor 926 form the desired output of the bottom edge detection circuitry 140 in FIG. 6 and are the control addresses on conductors 436 through 440 in FIGS. 11 and 12 for the main memory data multiplexers 509, 510, 511 and 512 in FIG. 12.

The digital data from the analog to digital conversion circuitry on conductors 143 through 168 was shown in FIG. 6 as going to the input data buffer 139 and the main memory 136. Attention can now be focused on the operation of the main memory 136, and the subsequent data operations of the main memory data multiplexer 137 and the first data accumulator register 138.

Figure 12:
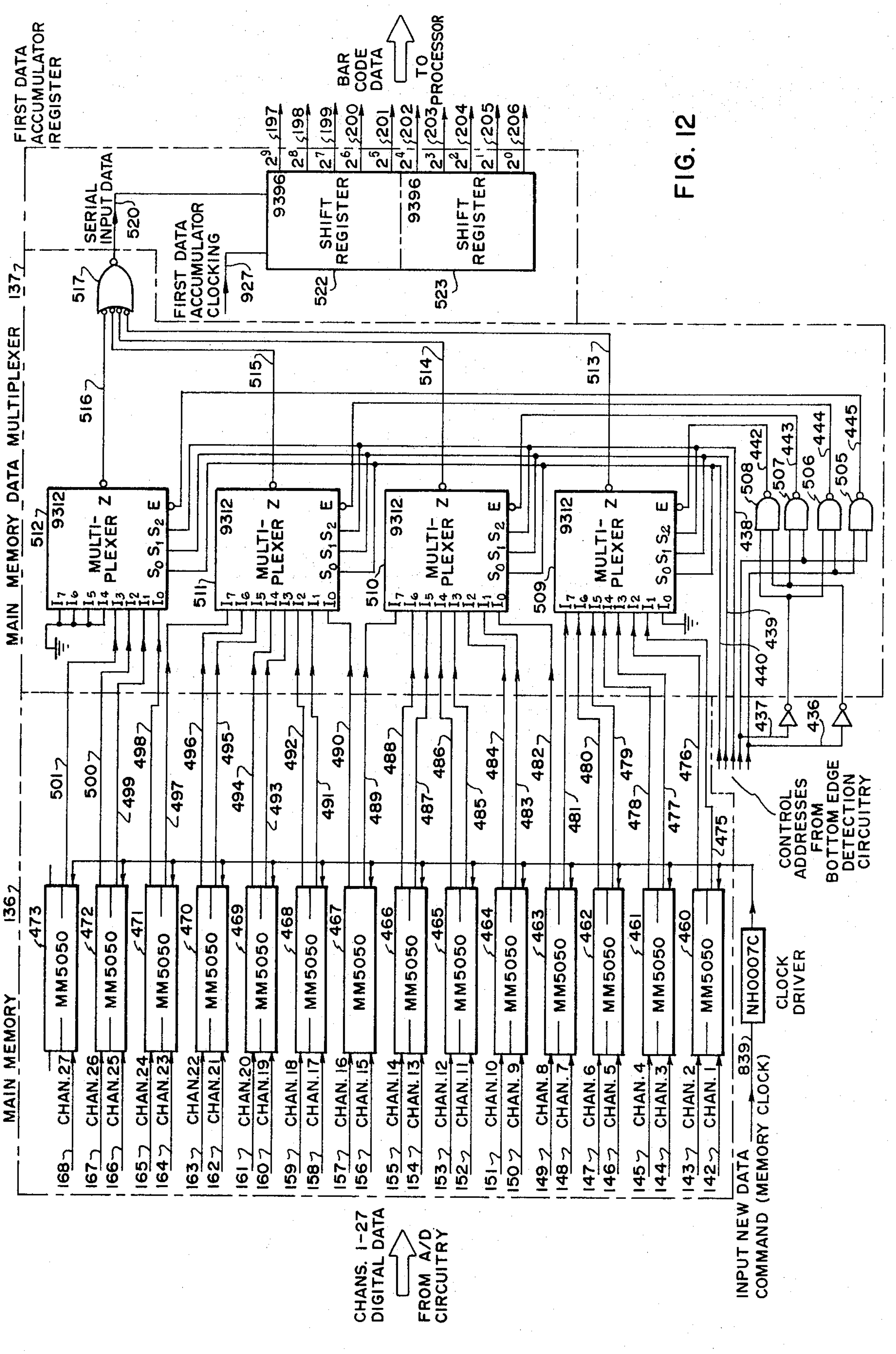
FIG. 12 is a block and circuit diagram of a portion of the system illustrated in FIG. 6.

The purpose of the main memory 136 is to provide a delay to all the input data on conductors 142 through 168 of FIG. 12 while the bottom edge detection circuitry 140 performs its required data manipulations as shown in FIG. 11. The serial-in, serial-out shift registers used and numbered as components 460 through 473, are dual shift registers as previously described in FIG. 11, and are shifted each time a new Input Data Command signal on conductor 839 is generated. Those skilled in the art will realize that the MOS shift registers used which are National Semiconductor type MM5050 with their attendant clock driver type NH0007C, are not the only devices or configurations available for introducing the required delay. However, they form a convenient configuration.

The purpose of the main memory data multiplexer 137 (FIG. 12) is to steer data out of the main memory 136 into the first data accumulator register 138. The steering operation must be performed under the control of the output of the bottom edge detection circuitry output available on conductors 436 through 440. The technique used is to serialize the data by starting with the first address given by the bottom edge detection circuitry on the conductors 436 through 440, then continuing with the subsequent sequential addresses generated by the bottom edge detection circuitry and available on the same conductors. Those skilled in the art realize that the technique used is not the only way of accomplishing the task; the use of 8 input multiplexers, Fairchild Semiconductor type 9312, required the use of some form of logic decoding which was accomplished by the logic elements numbered 505 through 508, and could have been accomplished in some other fashion. A logical OR operation performed by logic component numbered 517 combines the outputs from the multiplexer devices numbered 509 through 512 into a serial input data stream on conductor 520 for use as an input to the first data accumulator register 138 which was formed by the use of two serial in, parallel out shift registers numbered 522 and 523.

The purpose of the First Data Accumulation Register 138 is to convert its serial input data on conductor 520 into a format suitable for further processing. The serial input data contains the bar code data bits and must be assembled into a 10 bit word format for use by the processor 13. By using two shift registers numbered 522, 523 and of Fairchild Semiconductor type 9396, and a data clocking signal called First Data Accumulator Clocking, available as an input on input 927, that shifts data into the shift registers, the serial to parallel data conversion is easily accomplished. The bar code data bits are now available in a 10 bit word format on conductors 197 through 206 and now forms the input to the processor 13.

Figure 13:
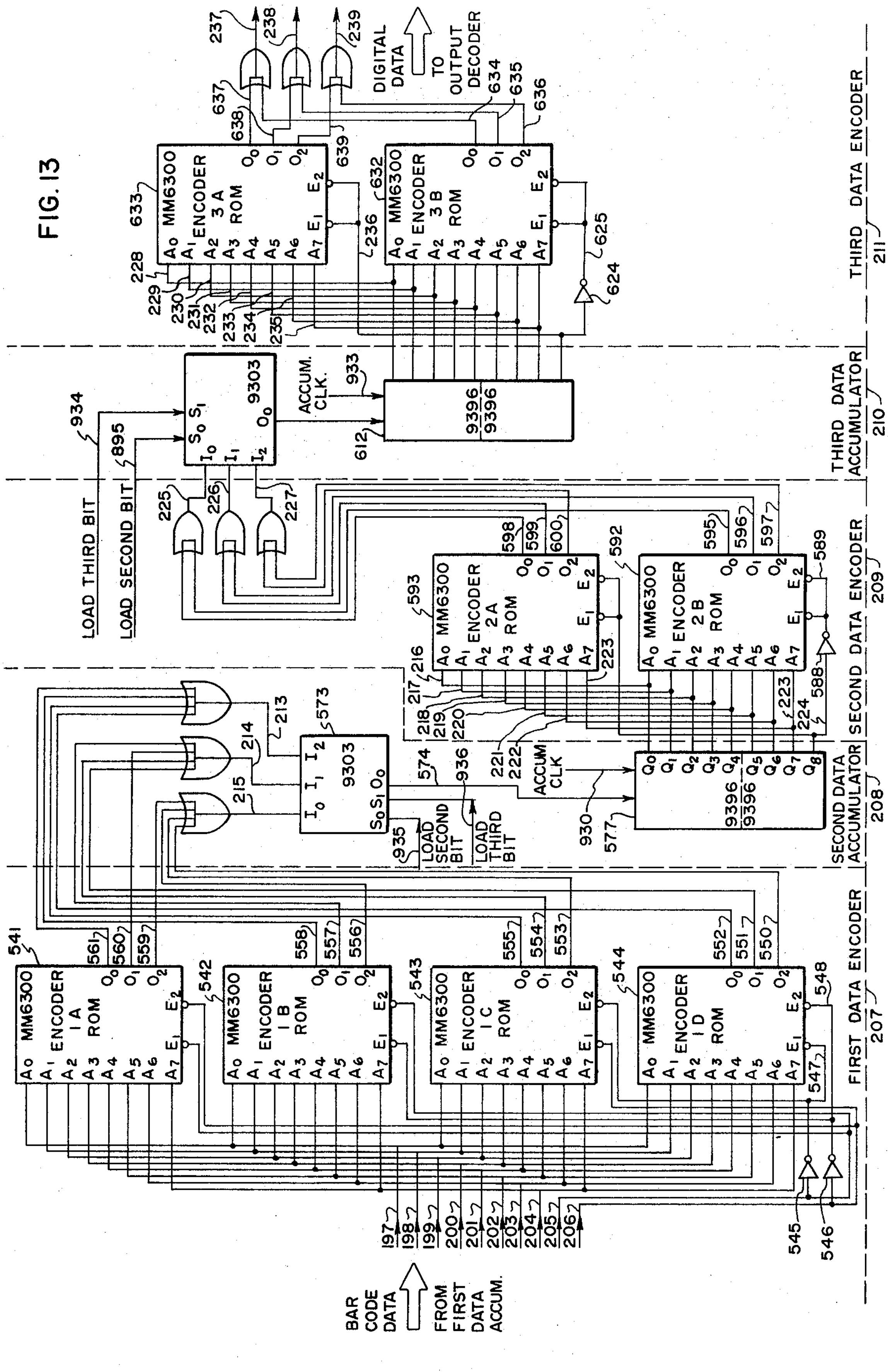
FIG. 13 is a block and circuit diagram of a portion of the system illustrated in FIG. 7.

The block diagram for the processor 13 is shown in FIG. 7. The data encoders and accumulators numbered 539 in FIG. 7 are shown in detail in FIG. 13. As previously indicated, the bar code data on conductors 197 through 206, from the first data accumulator 138 form the 10 bit word input to the first data encoder 207. The encoder 207 has the stored a-priori classifications of all input data patterns so that as soon as an input data pattern is stabilized at the encoder's input on conductors 197 through 206, the data pattern's category classification is looked up and generated as an output on conductors 213, 214 and 215. Devices that can store this information are read only memories, and those type devices are the ones used, as is shown in FIG. 13. Those skilled in the art are aware of the multitude of devices that are applicable, in addition to the Monolithic Memories (of Sunnyvale, California) devices MM6300 used here. The devices used here required the decoding of two of the input signals on conductors 205 and 206 and was accomplished with the use of inverters 545 and 546, and the enable inputs, E1 and E2, on the components 541, 542, 543 and 544 so that the stored classification available on cnductors 550 through 561 could be brought out of the proper one of the four read only memory devices numbered 541 through 544. By having only one of the read only memory devices active, the serialization of the input pattern's three binary bit classification is easily achieved through the use of a multiplexer component numbered 573. The serial data generated by the multiplexer numbered 573 is now on conductor 574 and forms the input to the second data accumulator 208.

The purpose of the second data accumulator 208 is to accumulate sequential input data pattern classifications generated by the first data encoder 207 and to present them in the suitable format of a 9 bit word on conductors 216 through 224 to the second data encoder 209. Stated another way, the second data accumulator 208 converts the sequential serial outputs of the first data encoder 207 into parallel inputs for the second data encoder 209. The data that would be contained in the accumulator register, based on the latest output from the previous encoder could be, for example, A–10, A–11, A–12 in the top three positions of the accumulator and available on conductors 216, 217 and 218. The designation that will be used is such that the A represents a classification output from the first data encoder 207. The next digit represents the sample number being considered. The third digit would represent the binary significance of the bit. Thus, A–10 would be a first data encoder classification of the first sample being considered, and would be the lowest ordered bit of the three bits used in determining the binary number assigned to the data classification. The bit A–33 would be an output from the first encoder for the third sample being considered and would be the highest ordered bit of the three bits used in determining the binary number assigned to the data classification. As indicated, the A–XX bits would be logical 1's or 0's, as required, to denote the complete classification of the input data pattern. During the next reader operation cycle, a new output would be generated out of the first encoder, say A–20, A–21, A–22. The previous classification output A–10, A–11, A–12, would be moved to the next three lower positions and would be available in conductors 219, 220 and 221 and the newer output would be placed in the top three positions and would be available on conductors 216, 217 and 218. During the next reader operation cycle, a new output would be generated out of the first encoder, say A–30, A–31, A–32. The same sequence of steps would be followed in shifting data into the second data accumulator 577 so that now the full register's contents would be A–30, A–31, A–32, A–20, A–21, A–22, A–10, A–11 and A–12, and would be available on conductors 216 through 224 respectively.

The accumulated data now represents the results of three consecutive input data classifications. As a result of the next input data classification by the First Data Encoder 207, the second data accumulator 577 will now contain a newer output since the oldest output would be discarded. The accumulated classifications would now be designated A–40, A–41, A–42, A–30, A–31, A–32, A–20, A–21, and A–22, and would be available on conductors 216 through 224 respectively. After the next reader input cycle, the fifth considered so far, and following the same data handling scheme, the input data classifications would be designated as A–50, A–51, A–52, A–40, A–41, A–42, A–30, A–31, and A–32, and would be available on conductors 216 through 224 respectively. A thing to note here is that from the time input data classifications were kept track of, as many new input classifications had to occur as there is room for in the second data accumulator 208, before the second data encoder 209 could generate a valid data classification. Stated another way, there is room for three input data classifications in the second data accumulator 208, so three input data classifications must be generated before all "good" data will be present in the entire accumulator for use as an input to the second data encoder 209. Subsequently, every time a new input data classification is generated another "good" input data pattern will exist in the second accumulator. The first good input data pattern will be A–30, A–31, A–32, A–20, A–21, A–22, A–10, A–11, and A–12, and will be available on conductors 216 through 224. The next good input data pattern will be A–40, A–41, A–42, A–30, A–31, A–32, A–20, A–21, and A–22 again available on conductors 216 through 224. The next good input data pattern will be A–50, A–51, A–52, A–40, A–41, A–42, A–30, A–31, and A–32, available on conductors 216 through 224. This sequence will obviously continue until reading stops. The outputs of the second data accumulator register 208 on conductors 216 through 224, form the input to the second data encoder 209.

The previously stated purpose of the second data encoder 209 is to choose the most likely classification for its particular input data pattern. As its inputs, the second data encoder 209 has three consecutive decisions of input data classifications on conductors 216 through 224, that were generated by the first data encoder 207. Hence, for the previously stated second data encoder input case of A–30, A–31, A–32, A–20, A–21, A–22, A–10, A–11, and A–12, a new classification will be generated and designated B–10, B–11, and B–12, and will be available on conductors 225, 226 and 227, and the same convention will be followed in the designation of classification bits, with the B designation indicating a classification from the second data encoder. As previously indicated, the classification coding scheme is identical to that used to identify the input data classes in the first data encoder 207 and will be composed of three binary bits for a total of 8 possible classifications. The B–XX's represent the appropriate binary bits that are combined to form the number that identifies the selected classification. This second classification of the input data pattern is now a second guess, or a second generation estimate, of the correct classification of the original input data pattern. Since the second classification is based on more than one input data sample, the confidence level on the correctness of this newer input data classification will be higher. During the next reader operation cycle, the second data accumulator 208 will present the next accumulated input data classifications on conductors 216 through 224 to the second data encoder 209. These accumulated data classifications, A–40, A–41, A–42, A–30, A–31, A–32, A–20, A–21, and A–22, available on conductors 216 through 224, will be the basis for another second generation estimate of the input data pattern classification, B–20, B–21, B–22, and will be available on conductors 225, 226, and 227. In the next reader operation cycle, the input to the second data encoder 209, on conductors 216 through 224, will consist of the A–50, A–51, A–52, A–40, A–41, A–42, A–30, A–31, and A–32 bit pattern, whatever it may be, and will generate another second generation estimate of the input data pattern classification, B–30, B–31, B–32, on conductors 225, 226, and 227.

A feature of this processing algorithm now becomes obvious. When the B–10, B–11, and B–12 classification estimate was formed, three sequential input data classifications were used, the A–3X's, the A–2X's, and the A–1X's, where the X's represent 0, 1, and 2. The A–1X classification was the first input data classification, and can now be discarded in favor of a new input data classification, the A–4X's. Thus, each sequential second generation input data classification estimate uses not only some of the previously considered input data classifications but is also incorporates newer input data classifications. In other words, the B–20, B–21, and B–22 second generation estimate now uses not only the newer classifications A–4X's, but also the older A–3X's and A–2X's input data estimates. Subsequent second generation estimates use two older input data classifications and one new input data classification.

Those skilled in the art will recognize that the length of the second data accumulator 208 and the size of the read only memory that forms the second data encoder 209 will determine how many individual input data classifications are used in generating a second generation input data classification estimate. Also obvious to those skilled in the art is that the combination of previously used and previously not used input data classifications can be changed by changing the time relationships between the shifting of new data into the second data accumulator 208 and the acceptance of outputs out of the second data encoder 209 into the third data accumulator. This invention was implemented using all of the second generation estimates so that when a new first generation input data classification was shifted into the second data accomulator 208, a new second generation input data classification out of the second data encoder, was accepted into the third data accumulator 210 available on conductors 225, 226 and 227. By using every other second generation estimate generated, and the number of previously unused input data classifications could be increased to two per new input data classification while the number of previously used input data classifications would decreased to one, assuming the length of the second data accumulator register 208 was not changed. The second generation estimates, the B–XX's now form the inputs on conductors 225, 226, and 227 to the third data accumulator 210.

The purpose of the third data accumulator 210 is similar to that of the second data accumulator 208. The third data accumulator 210 will accumulate sequential, second generation, input data pattern classification estimates, and will present these estimates in a suitable format on conductors 228 through 235 to the third data encoder 211. The suitable format for the third data encoder 211 will be in a parallel bit format on conductors 228 through 235, as indicated in FIG. 13. The sequence of operations is identical to that of the second data accumulator 208 and the output of this accumulator forms the input to the third data encoder 211.

The purpose of the third data encoder 211 is similar to that of the second data encoder 209. The thrid data encoder 211 takes three consecutive second generation input data classification estimates and use them as the basis for a third most likely input data classification of the input data pattern. This latest classification will now be made on the basis of the three accumulated input data classifications available in the third data accumulator 210. Continuing with the previously used designation for generated estimate call-out, this third encoder will now generate an estimate that will be identifiable as C–10, C–11, and C–12. The third encoder input data pattern on conductors 228 through 235 was B–30, B–31, B–32, B–20, B–21, B–22, B–10, B–11, and B–12. The input on conductors 216 through 224 for the second data encoder 209 when the B–10, B–11, and B–12 input data classifications estimate was generated were A–30, A–31, A–32, A–20, A–21, A–22, A–10, A–11, and A–12. The inputs on conductors 216 through 224 for the second data encoder 590 when the B–30, B–31, and B–32 input data classification estimate was generated was A–50 A–51, A–52, A–40, A–41, A–42, A–30, A–31, and A–32. Obviously, for each third generation estimate generated, five sequential input data classifications were used so that a longer history of input data is available to base each third generation input classification. Obviously, the next third generation estimate generated by the third data encoder 211, and available on conductors 237, 238, and 239, will include 4 previously used input data classifications and 1 previously unused input data classification Those skilled in the art will notice that the encoding scheme can be applied as many times as required for the particular application. For the bar/half bar system, only three encoding operations were required to achieve satisfactory results. For the third data encoder 211, the number of input data classifications was changed from eight categories to five categories. The binary representation of the categories was 000 for no data is present; 001, for in-between bars indication is present; 010, for a 1, or long, bar is present; 100, for a 0, or short, bar is present; 110, for either a long or a short bar is present, and bar code data has been located. The three binary bit output of the third data encoder 211, and available on conductors 237, 238, and 239 forms the input to the output accumulator and decoder 212 in FIG. 7.

Figure 14:
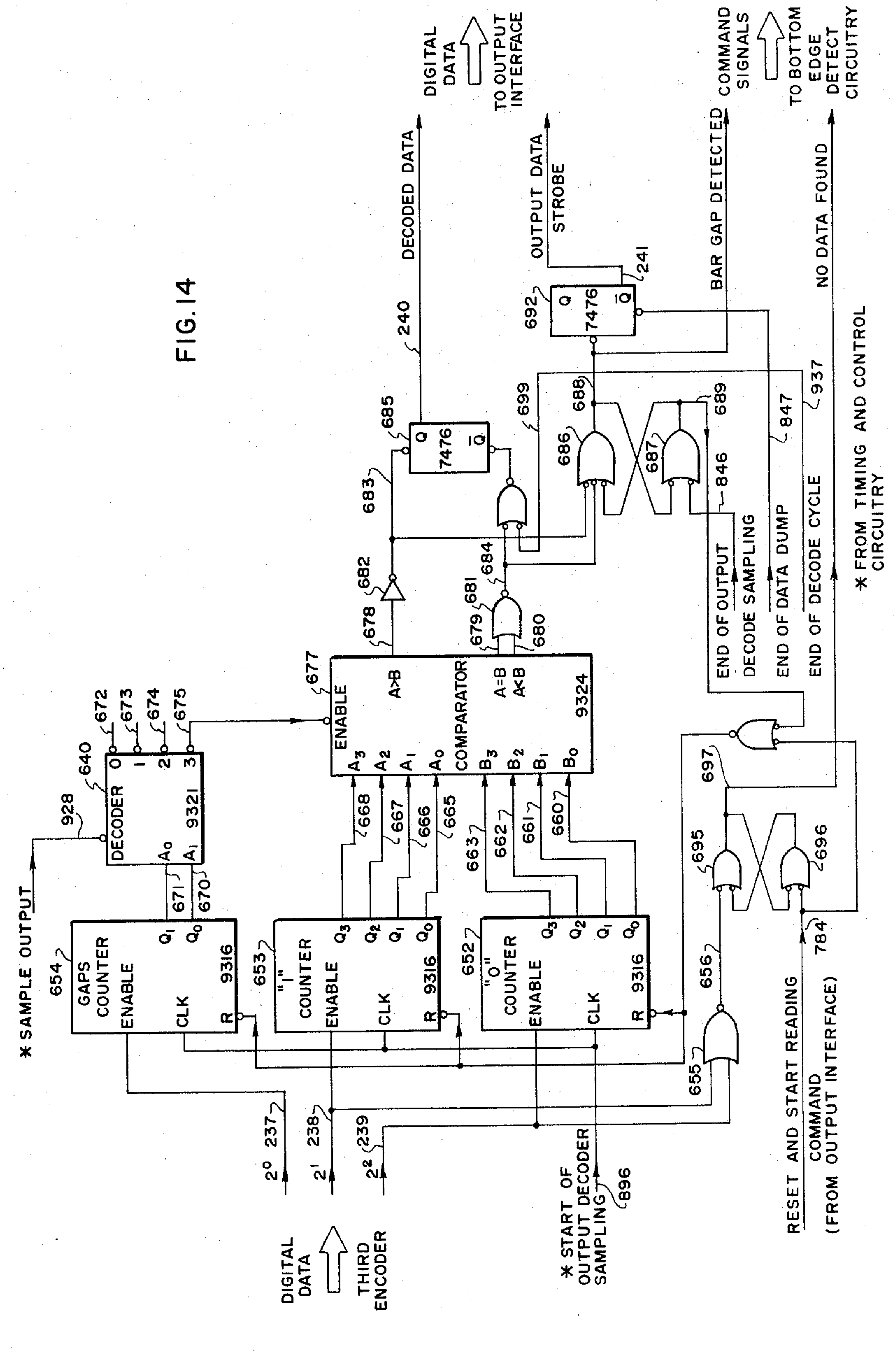
FIG. 14 is a circuit diagram of a portion of the system illustrated in FIG. 7.

The purpose of the output accumulator and decoder 212 in FIG. 7, is to accumulate the sequence of outputs from the third data encoder 211 and when the proper input data pattern classifications are present, compare the accumulated input data classifications and generate output signals to some output interfaces 14. FIG. 14 illustrates the circuitry for the accumulation and decoding operation. The input data to the output accumulator and decoder is the output data from the third data encoder 211 available on conductors 237, 238, and 239. Since each binary bit represents an estimate of the input data pattern, all three third encoder output signals on conductors 237, 238 and 239 are used as individual enable signals for one of three counters. The counters, in keeping with the possible input states, are the gap counter numbered 654, the 1 counter numbered 653, and the 0 counter numbered 652. The gap counter 654 provides a representation of an "off data" or "in between bars" condition. The state of the 1 counter 653 provides a representation of the number of times the input data pattern of the system was estimated as being due to a long bar, while the state of the 0 counter provides a representation of the number of times the input data pattern of the system was estimated as being due to a short bar. When the system is given a command to read, the three output data accumulation counters 652, 653, and 654 are reset and when either a 1 or a 0 input state is indicated by the output of the third data encoder on either of the conductors 238 or 239, the No Data Found signal on conductor 697 is removed by the combined logical interaction of logic elements 655, 695, and 696. The counters 652, 653 are incremented with each third encoder output, depending on the type of output, until the "In-Between Data" signal is generated on conductor 237 enabling the gap counter to increment. Again, since errors are possible in the encoding process, a minimum number of "In-Between Data" decodings are required. Three such data decodings were found to be an adequate balance between generating too much information and not generating enough information. Stated another way requiring three "In-between Bars" signals on conductor 237 before outputing any data, formed a good compromise between an increasing false-decoding of data and missed decoding of data. When three "In-between Bars" signals are decoded due to the "in-between bars" signals on conductor 237, the state of counter 654 as decoded by the decoder 640, and indicated as a signal on conductor 675, a comparison is made of the states of the 0 counter available on conductors 660 through 663 and the 1 state available on conductors 665 through 668 in the amplitude comparator numbered 677. Whichever counter had the higher state would determine the final decision the reader would generate. If the counters were in the same state a signal would be present on conductor 679, and a final output of 0 would be generated since the decision-making process would have implied an input data pattern that was definitely due to a short bar, but could possibley be due to a long bar. Going with the more certain of the two alternatives, for the case with both counters 652, 653 in the same state, the final output would indicate a short bar or 0 bit. An output data strobe signal on conuctor 241 would be generated during the time interval corresponding to the time that the end of the output decoder sampling signal is present on conductor 846. To provide an indication to the output interface that a valid bit of data has been decoded by the reader system. A Bar Gap Detected signal on conductor 688 is generated to indicate to the bottom edge detection circuitry that a search for a new bar bottom should be initiated. The output information is now passed to the output interface 14 for further processing, as indicated in FIG. 7.

Figure 15:
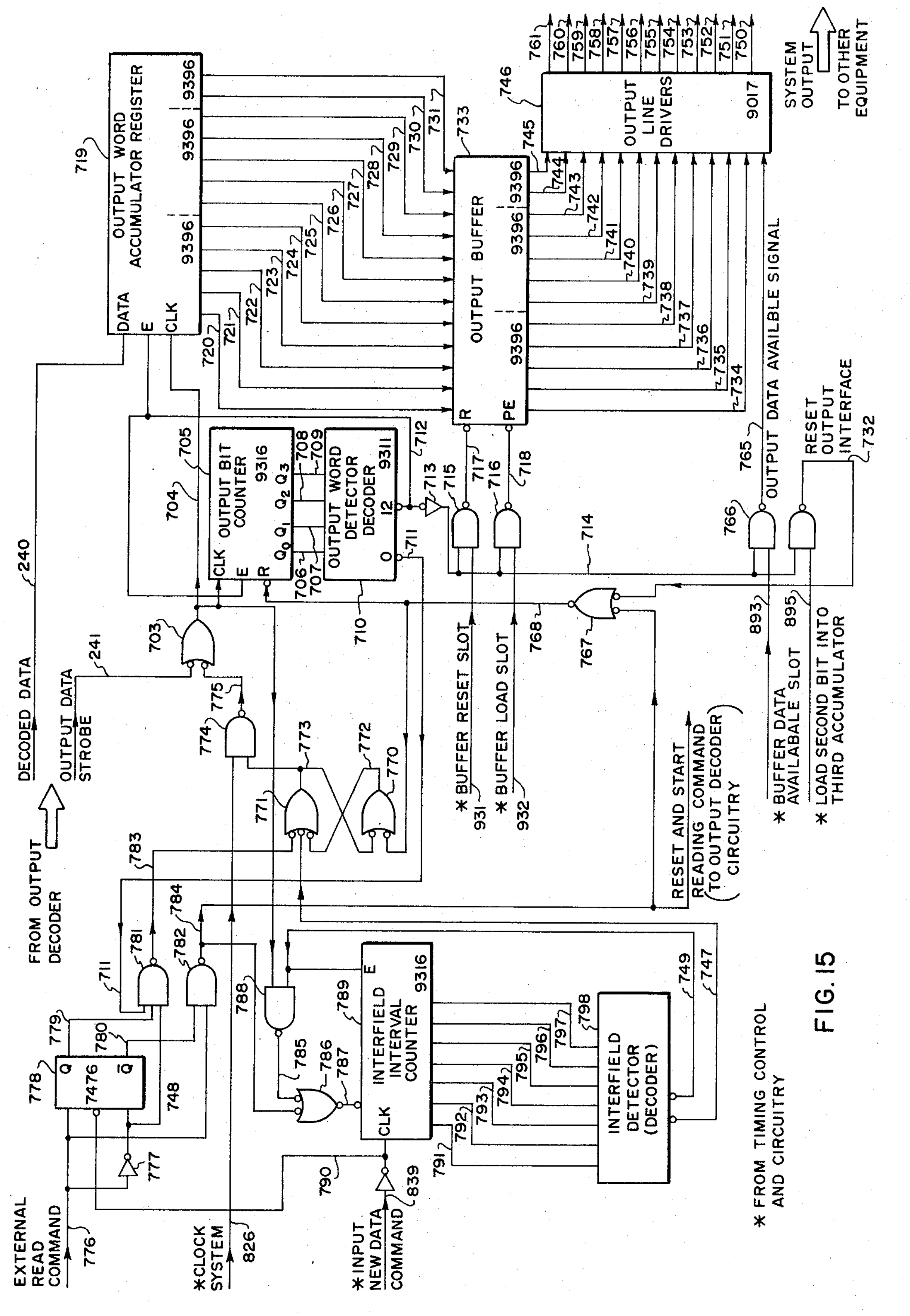
FIG. 15 is a circuit diagram of a portion of the system illustrated in FIG. 7.

The output interface 14 circuitry has been identified as having the task of arranging the output data into the format required by the reader user. This particular application required the assembling of bar code data bits into groups of 12 bits, then outputing the 12 bits as a single word. In addition, data packing is also required when a space equal to 5 bar spaces does not contain data or when the command to read data is removed. As shown in FIG. 15,to arrange the word into the 12 bit format,the output Data Strobe signal on conductor 241 is used to increment a modulo 12 counter used as an output bit counter 705 and to clock data into an output word accumulator register 719. Since data packing is also required, additional clock signals available on conductor 286, are gated as required by logicgate 774, and the gated clock would be used to clock zero data into the output word accumulator register 719 and to step the output bit counter 705. When twelve bits have been assembled into the output word accumulator register 719, a decoder 710, monitoring the state of the output bit counter 705 on conductors 706 through 709, generates an enable signal on conductor 712 that, through an inverter 713, allows the output buffer 733 to be cleared of data with an input on conductor 717, and then loaded under command of an input on conductor 718, with the latest accumulated data available on conductors 720 through 731, from the output word accumulator register 719. The latest data, now loaded into the output buffer 733, is also now available on conductors 734 through 745, through the output line drivers 746 to any other equipment on conductors 751 through 761. One reader operation cycle time slot later, a Data Available signal is generated under control of the Buffer data available slot signal on conductor 893 and through the line drivers 746, is also made available to other external equipment on conductor 750. During the reader operation cycle time slot following the Data Available Slot signal that was available on conductor 893, which corresponds to the time the second bit is being loaded into the third data accumulator 212, the output bit counter 705 is reset and the accumulation cycle starts again. To fulfill the additional packing requirements, the external Read Command signal must be monitored so that an indication is given when the Read Command on conductor 776 first appears, and indication of which is available on conductor 784, and when the Read Command on conductor 784 and when the Read Command signal is removed an indication of which is available on conductor 783. The first case leads to a Reset and Start Reading Command on conductor 784 while a data packing signal on conductor 783 is generated in the second case. To determine when more than four bit slots are without data on the envelope, an interfield interval counter 789, together with a decoder 798, are used to determine the distance traveled without reading any bar code data. Since the envelope speed is known and the input data rate is known a determination of the modulus of the interfield counter can be determined and set into the decoder 798. Once that terminal count is reached, another data packing command is given on conductor 773 and any accumulated data is made available to outside equiment. The interfield interval counter is reset by Output Data Strobe signals available to conductor 704, unless the counter has already reaches its terminal state as indicated by having had a signal on conductor 747, and cannot be reset due to the signal on conductor 749. As is obvious to those skilled in the art, different word formats and different packing requirements can be established by different users, leading to different "housekeeping" requirements. A' different set of housekeeping realization with the discrete logic is possible and may prove desirable for other configureations. Also obvious to those is the sequential control that all the timing signals provide, so that the bar code data is used as a series of enable signals.

Figure 16:
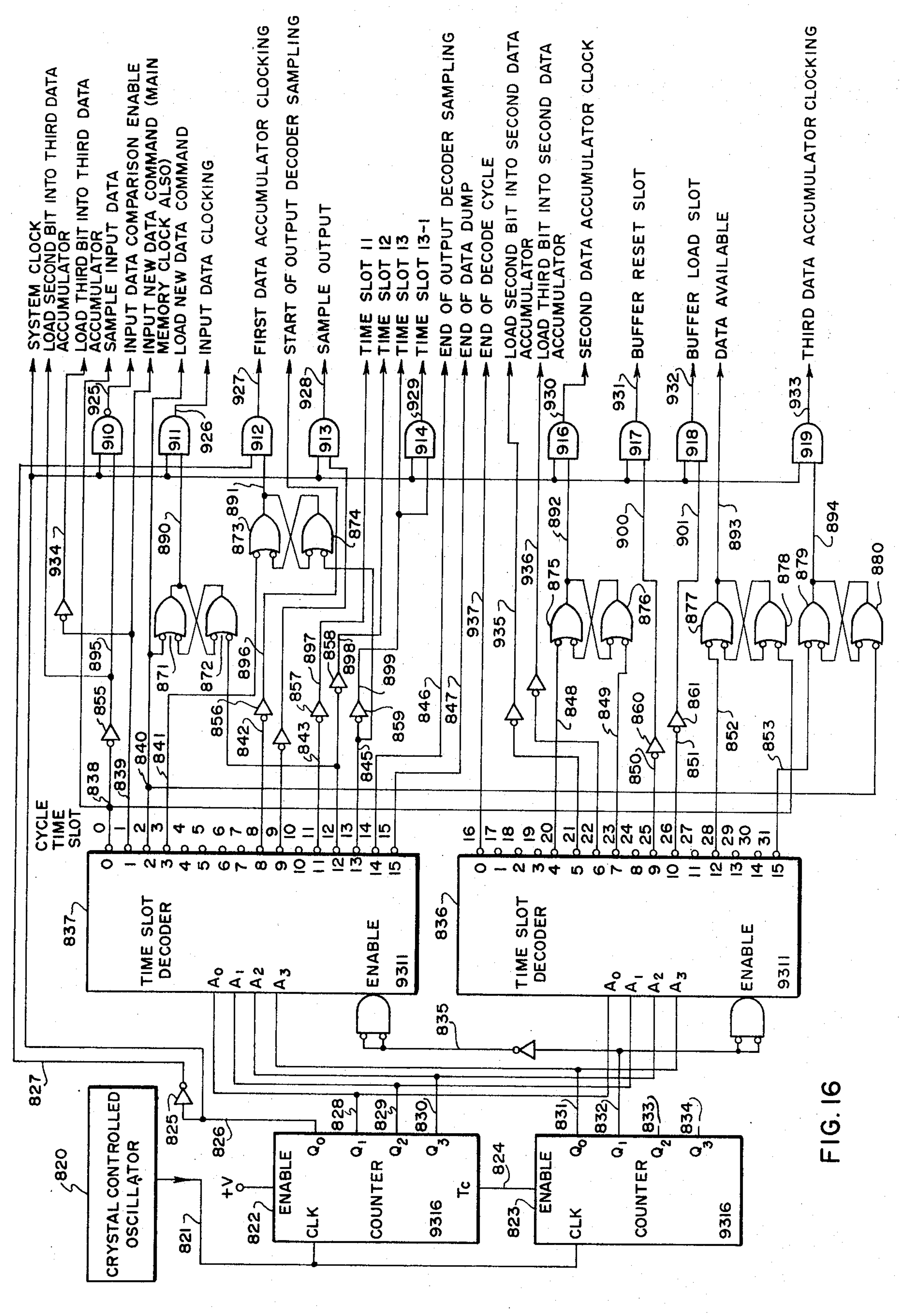
FIG. 16 is a circuit diagram of a portion of the system illustrated in FIG. 7.

The timing and control circuitry 15, in FIG. 7, is shown in detail in FIG. 16. The timing and control circuitry was implemented using a crystal oscillator 820 and two counters 822, 823. The states of the counters were decoded using the standard decoders numbered 836 and 837, so that 32 individual time slots were available for performing anyreader functions required. When several functions required more than one time interval, as did, for example, the Input Data Clocking on conductor 926, an R–S latch arrangement composed of logic elements 871, and 872 were used to generate the multi-time slot enable signal required. The entire clocking operation was carried on similarly, as is obious to those skilled in the art. The inter-relationship of the timing signals is further shown in FIG. 8, which is a timing diagram showing the phasing associated with all the operations within a 32 slot reader operation cycle. The shaded areas with the Encoder Delay are times available for devices to react to their input data. As is obvious to those skilled in the art, different memory devices use varying lengths of time before their output data is valid. The other otherwise unidentified, shaded areas indicate the times that the memory data may not be stable, so that some settling time can be provided. The remaining signals are self-explanitory.

Those skilled in the art are aware that there are variations possible in the requirements for the functional blocks described for this reader. In particular, the criterion involved in the decision making involved in the bottom edge detection circritry 239 may have to be modified; the number of categories that must be handled within the data encoders and accumulators 539, and the output accumulator and decoder 650 may also have to be modified.

The presently described bottom edge detector circuitry operates on the assumption that little or no extraneious data exists within the field of view of the reader. Were there significant amounts of extraneous data within the reader's field of view, a different input data buffer 139 in FIG. 11 would have to be utilized. Instead of the simple print cluster identification function presently embodied in the implementation, a different "input filter" would have to be used. An approach that may be used in the input data buffer is to form a cross-correlation of the input data against a stored data pattern expected from the code. The degree of correlation that the input filter must obtain with the code depends on the cross-correlation of the code with the expected extraneous data. For example, if the extraneous data consisted of alpha-numeric characters, the bar code pattern would, on the average, have more printing per unit area in the area where there is always data, as in the lower portion of the bar/half bar code. An investigation of the amount of printing would have to be made on an area at least as small, in the horizontal direction, as the alpha-numeric character. The output of the input filter would be Yes/No decisions answering the question, "Is a bar pattern present?." The input to the bottom edge detection circuitry would be a series of 1's in a field where the extraneous data had already been removed, analagous to the action of an electrical matched filter operating an analog data.

An additional advantage derived from the implementation described in this invention is obvious when the straight-forward implementation of the complete classification if input data is considered. For this case, a total of 10 signal channels were used as encompassing all the bar code data in the vertical direction. To generate a three binary bit classification for the 10 channels, assuming the same five horizontal samples for each decision classification, a total binary bit handling capability of 50 binary bits would have to be examined. If all possible combinations of bits must be handled, for the three binary bit classification, a total of $3 \times 2^{50}$ bit manipulation would have been involved. Using the bootstrapped technique described in this invention, the first complete classification manipulated $3 \times 2^{10}$ bits; the remaining two calssification techniques manipulated a total of $3 \times 2^{9}$ bits each, for a total of $6 \times 2^{10}$ bit manipulations for the five horizontal sample decision. A significant reduction in the number of bits handled was achieved. Stated another way using the straight-forward way of classifying five complete horizontal input samples into the eight categories possible with three binary bits, and if each horizontal sample had 10 binary bits, 50 binary bits would have been the input. Each of the 50 binary bit input combinations would have its three bit category assignment for a total of $2^{50}$ assignments of the three bit code. The bootstrapped technique described in this invention uses, for the first classification, $2^{10}$ assignments of the three bit code, since 10 channels are used as the input. For the second classification, a total of three, three binary bit classifications are used, for a total of a nine binary assignment, or $2^{9}$ assignments of the 3 bit code. The same assignment is made for the third classification. The total number of three bit assignments will be $2^{10}$, plus $2^{9}$, plus $2^{9}$, for a total of $2^{11}$ individual three bit assignments, instead of $2^{50}$ assignments in a straight-forward fashion. Since the statistics of the degradations of the input data were considered in the classification assignments, the use of the techniques described in this invention lead to the systematic organization of a cost effective, versatile processor.

An example of the versatility of this invention can be given in terms of how the equipment could be modified to read a different font code. As is obvious to those skilled in the art, the data alignment function of the input data buffer 139 and the bottom edge detection circuitry 140 in FIG. 6 would have to be modified to be able to locate the different font code. In particular, if the font to be read consisted of typed alpha-numerics, the characters would have to be located and tracked by electrical or mechanical means. Having tracked the data, attention can now be focused on the printing/no printing decisions equivalent to the input to the first data encoder on conductors 197 through 206 in FIG. 13. A different first data encoder would have to have more categories into which to classify the input data. Each additional binary bit doubles the number of categories available, so that with a 4 binary bit code, 16 categories are available for classifying the input data, and 32 categories are available using 5 binary bits. The classifications possible can be into categories that would denote, for example, the following input data patterns: "A small cluster of data is present, high in the field of veiw"; "A small cluster of data is present, centered in the field of view"; "A small cluster of data is present, low in the field of view"; "Two small clusters of data are present, high and low in the field of view"; "A long cluster of data is present, centered on the field of view"; "A short cluster of data is present, high in the field of view"; "A short cluster of data is present, low in the field of view."

The list can easily be extended, and category numbers can be assigned to each type of data pattern. As an example, for the data categories above , the category classes can be assigned, in sequence the classification numbers of 1, 2, 3, 4, 5, 6, and 7, so that category 1 is "A small cluster of data is present, high in the field of view," and category 7 is "A short cluster of data is present, low in the field of view." The output, for varying inputs out of the new first data encoder would be a series of numbers to the new second data accumulator. Taking a simplistic approach, that is, ignoring the resolution requirements that are easily handled, the output of the new second data encoder, analagous to the output described as the output of the second data encoder 209, in FIG. 13, and available on conductors 225, 226, and 227, would be a collection of numbers that describe a time history of the input data train. For example, had a V been the character read, the data train into the second data accumulator, and hence to the second data encoder, would have been 1, 2, 3, 2, 1. The second data encoder would now be making estimates on the cause of the input data pattern. If three successive input samples were again used, the 1, 2, and 3 inputs would be classified by the second data encoder as "A slanted vertical line, going from top to bottom," the 2, 3, and 2 input data patterns would be classified as "A sharp turn-around in data"; the 3, 2, and 1 input data pattern would be classified as "A slanted vertical line, going from bottom to top." The accumulation and subsequent decoding of the second generation estimates into a V would be straight forward, since the names of the three input data pattern estimates, made using a longer time history of input data patterns, would be: "A slanted vertical line, going from top to bottom"; "A slanted vertical line, going from bottom to top." Additional data encoding and decoding exercises would yield data patterns such as 5, 5, 3, 5, 5, for a U. Other numbers and letters would yield similar classifications, as is obvious to those skilled in the art.

It should be noted in the drawings that various channels are sometimes referred to with a "C" designation before the number and at other times the "C" designation has been omitted. However, the channels with the "C" designation such as C–1, C–2, etc., are the same as chan 1 and chan 2, etc.

Although the invention has been described in considerable detail with reference to a certain preferred embodiment, it will be understood that variations and modifications may be made within the spirit and scope of the invention as defined in the appended claims.

What is claimed is:

1. Apparatus for viewing and processing information on an article comprising:

means for viewing a portion of said information, means for producing signals representing successive portions of said viewed information, first data classifying means for determining from the signals representing successive portions of said information a first generation classification of the most likely cause for said series of signals and for providing an output signal representing said most likely cause, first data accumulating means for accumulating and converting a sequential series of first generation classification output signals from said first data classifying means into parallel first generation classification output signals, second data classifying means for determining from the parallel first generation classification output signals received from said first data accumulating means a second generation most likely cause for the parallel first generation classification output signals, second data accumulating means for accumulating and converting a sequential series of second generation classification output signals from said second data classifying means into parallel second generation classification output signals, and third data classifying means for determining from the parallel second generation classification output signals from said second data accumulating means a third generation most likely cause for the parallel second generation most likely cause for the parallel second generation classification output signals.

2. The apparatus of claim 1 wherein said first data classifying means, said second data classifying means, and said third data classifying means each comprises means for determining a classification based upon the type of viewed information which would have the highest probability of deteriorating into the signals being considered for classification.

3. The apparatus of claim 1 further comprising means for automatically seeking the location of the bottom edge of said information on the article.

4. The apparatus of claim 1 wherein said means for viewing a portion of said information comprises an optics system.

5. The apparatus of claim 4 wherein said optics system includes both a cylindrical lens and a circular lens.

6. The apparatus of claim 5 wherein said optics system further comprises a second cylindrical lens.

7. The apparatus of claim 6 wherein said second cylindrical lens has its long axis at substantially a right angle to the long axis of said first cylindrical lens.

8. The apparatus of claim 7 wherein said circular lens is positioned between said first cylindrical lens and said second cylindrical lens.

9. The apparatus of claim 8 wherein said optics system further comprises a dichroic filter located in front of said first cylindrical lens.

* * * * *